US012094439B2

(12) United States Patent
Goodrich et al.

(10) Patent No.: US 12,094,439 B2
(45) Date of Patent: Sep. 17, 2024

(54) STRINGED INSTRUMENT

(71) Applicant: Forte3D, LLC, Ardmore, PA (US)

(72) Inventors: Alfred Goodrich, Ardmore, PA (US); Elijah Lee, Villanova, PA (US)

(73) Assignee: Forte3D, LLC, Ardmore, PA (US)

( * ) Notice: Subject to any disclaimer, the term of this patent is extended or adjusted under 35 U.S.C. 154(b) by 0 days.

(21) Appl. No.: 17/756,743

(22) PCT Filed: May 6, 2022

(86) PCT No.: PCT/US2022/072167
§ 371 (c)(1),
(2) Date: Jun. 1, 2022

(87) PCT Pub. No.: WO2022/241389
PCT Pub. Date: Nov. 17, 2022

(65) Prior Publication Data

US 2024/0185816 A1 Jun. 6, 2024

Related U.S. Application Data

(60) Provisional application No. 63/187,970, filed on May 13, 2021.

(51) Int. Cl.
*G10D 3/04* (2020.01)
*G10D 1/02* (2006.01)
(Continued)

(52) U.S. Cl.
CPC ................. *G10D 3/04* (2013.01); *G10D 1/02* (2013.01); *G10D 3/02* (2013.01); *G10D 3/06* (2013.01)

(58) Field of Classification Search
CPC .. G10D 3/04; G10D 1/02; G10D 3/02; G10D 3/06; G10D 3/00; G10D 1/00
See application file for complete search history.

(56) References Cited

U.S. PATENT DOCUMENTS 2,977,835 A 4/1961 Hornseth
3,427,915 A 2/1969 Mooney
(Continued)

FOREIGN PATENT DOCUMENTS

GB 776170 A 6/1957
JP 3633826 B2 3/2005
WO 2022092327 A2 5/2022

OTHER PUBLICATIONS

International Search Report and Written Opinion for corresponding International application No. PCT/US2022/072167; dated Aug. 3, 2022 (10 pages).

(Continued)

*Primary Examiner* — Kimberly R Lockett
(74) *Attorney, Agent, or Firm* — Mendelsohn Dunleavy, P.C.; Steve Mendelsohn

(57) ABSTRACT

A stringed instrument, such as a violin, viola, cello, or double bass, having an inherently flat back and an inherently flat top separated by a rib structure. An interior soundpost spans between the back and the top. A bridge supports the strings over the top. When tension is applied in the strings such that the bridge applies force to the top and the soundpost applies force to the back, the top acquires a concave shape and the back acquires a convex shape. In a particular embodiment, the instrument has retaining rings mounted on interior surfaces of the back and top keep the soundpost from falling over, two subassemblies interconnected by an adjustable screw-and-nut arrangement to achieve different string heights, a nut opening configured to receive differently sized top nuts for different string heights, and an inherently straight bass bar, where the bridge has feet having inherently collinear bottoms.

21 Claims, 25 Drawing Sheets

(51) Int. Cl.
*G10D 3/02* (2006.01)
*G10D 3/06* (2020.01)

(56) References Cited

U.S. PATENT DOCUMENTS

| | | | | |
|---|---|---|---|---|
| 3,699,836 | A | | 10/1972 | Glasser |
| 3,969,971 | A | | 7/1976 | Delu |
| 4,242,938 | A | | 1/1981 | van Zalinge |
| 4,408,516 | A | | 10/1983 | John |
| 4,592,264 | A | | 6/1986 | Svoboda |
| 4,809,579 | A | | 3/1989 | Maccaferri |
| 4,836,076 | A | | 6/1989 | Bernier |
| 4,955,274 | A | | 9/1990 | Stephens |
| 5,171,926 | A | | 12/1992 | Besnainou et al. |
| 6,120,910 | A | | 9/2000 | Szenics |
| 6,284,957 | B1 | | 9/2001 | Leguia |
| 7,514,615 | B2 | | 4/2009 | Ribbecke |
| 7,687,695 | B2 | | 3/2010 | DeJule |
| 7,763,784 | B2 | | 7/2010 | Luttwak |
| 8,592,668 | B1 | | 11/2013 | Kamimoto |
| 8,624,095 | B2 | | 1/2014 | Pukalo |
| 8,729,371 | B2 | | 5/2014 | Yokoyama |
| 8,735,702 | B1 | | 5/2014 | Miles |
| 9,519,733 | B2 | | 12/2016 | Summit |
| 10,261,527 | B2 | | 4/2019 | Raniere |
| 10,818,274 | B2 | | 10/2020 | Glasser |
| 2002/0092402 | A1 | | 7/2002 | Griffiths |
| 2017/0200434 | A1 | * | 7/2017 | Bragg .................... G10D 3/06 |
| 2023/0298545 | A1 | | 9/2023 | Takara |

OTHER PUBLICATIONS

3D Printed Modular Violin, www.makezine.com, 2020 [retrieved on Aug. 1, 2022] Retrieved from the Internet: <URL: https://makezine.com/projects/3d-printed-modular-violin/> (12 pages).
Digital Fabrication in the Designing and Manufacturing of Traditional Musical Instruments, www.dfabclass.com, 2020 [retrieved on Dec. 16, 2022] Retrieved from the Internet: <URL: https://dfabclass.com/22s/digital-fabrication-in-the-designing-and-fabrication-of-traditional-musical-instruments/> (6 pages).
3D StringTheory Project, www.dequincey-violin.com, 2019 [retrieved on Dec. 16, 2022] Retrieved from the Internet: <URL: https://dequincey-violin.com/2019/01/3d-stringtheory-project/> (5 pages).
Invitation to Pay Additional Fees and, Where Applicable, Protest Fee for International application No. PCT/US2023/072550; dated Dec. 12, 2023 (19 pages).

* cited by examiner

*FIG. 3*

TABLE I

| LABEL | PART NAME | MATERIAL | METHOD | PRODUCT NAME | PURCHASED FROM | ALTERNATIVE MATERIALS | ALTERNATIVE METHODS |
|---|---|---|---|---|---|---|---|
| 202 | TOP | 0.5mm TO 1.5mm THICK CARBON FIBER SHEET | CNCed | CUSTOM MADE | NINGBO HAISHU LIJING PLASTIC EQUIPMENT FACTOR – NINGBO, CHINA | POLYCARBONATE CARBON FIBER FILAMENT, WOOD, OTHER PLASTIC | TRADITIONAL CF MFG |
| 204 | BACK | 0.5mm TO 1.5mm THICK CARBON FIBER SHEET | CNCed | CUSTOM MADE | NINGBO HAISHU LIJING PLASTIC EQUIPMENT FACTOR – NINGBO, CHINA | POLYCARBONATE CARBON FIBER FILAMENT, WOOD, OTHER PLASTIC | TRADITIONAL CF MFG |
| 206 | RIBS | POLYCARBONATE CARBON FIBER FILAMENT | 3D PRINTED | | | WOOD, OTHER PLASTIC | INJECTION MOLDING, CARVED |
| 208 | HEEL | POLYCARBONATE CARBON FIBER FILAMENT | 3D PRINTED | | | CARBON FIBER, OTHER PLASTIC, WOOD | INJECTION MOLDING |
| 210 | NECK | POLYCARBONATE CARBON FIBER FILAMENT | 3D PRINTED | | | CARBON FIBER, OTHER PLASTIC, WOOD | INJECTION MOLDING |
| 212 | SCROLL | POLYCARBONATE CARBON FIBER FILAMENT | 3D PRINTED | | | CARBON FIBER, OTHER PLASTIC, WOOD | INJECTION MOLDING |
| 214 | STRINGS | METAL | PURCHASED | HELICORE OEM CELLO SET 4/4 x 2 | FIDDLERSHOP.COM–2703 GATEWAY DR., POMPANO BEACH, FLORIDA 33069 | | |
| 216 | TAILPIECE | PLASTIC | PURCHASED | CELLO TAILPIECE | NANTONG SINOMUSIC ENTERPRISE – JIANGSU, CHINA | | INJECTION MOLDING |
| 218 | TUNING PEGS | PLASTIC WITH INTERNAL METAL GEARS | PURCHASED | WITTNER FINETUNE GEARED CELLO PEG SET 12mm/4 PEGS | FIDDLERSHOP.COM–2703 GATEWAY DR., POMPANO BEACH, FLORIDA 33069 | | |

*FIG. 3 cont. 1*

| | | | | | | | |
|---|---|---|---|---|---|---|---|
| 220 | BRIDGE | WOOD | PURCHASED | BRIDGE | MICHAEL PURCELL, LUTHIER – 942 N 5TH ST., PHILADELPHIA, PA 19003 | POLYCARBONATE CARBON FIBER FILAMENT, OTHER PLASTIC | INJECTION MOLDING |
| 222 | SOUNDPOST | SPRUCE WOOD | PURCHASED | 11mm DIAMETER WOODEN DOWEL | AMAZON | CARBON FIBER, OTHER PLASTIC, WOOD | PULTRUDED CF, INJECTION MOLDING, TRADITIONAL CF MFG |
| 224 | TOP RETAINING RING | POLYCARBONATE CARBON FIBER FILAMENT | 3D PRINTED | | | CARBON FIBER, OTHER PLASTIC, WOOD | INJECTION MOLDING |
| 226 | BACK RETAINING RING | POLYCARBONATE CARBON FIBER FILAMENT | 3D PRINTED | | | CARBON FIBER, OTHER PLASTIC, WOOD | INJECTION MOLDING |
| 228 | BASS BAR | CARBON FIBER HOLLOW SQUARE ROD | PULTRUDED | 8mm OS, 6mm IS DPP CARBON FIBER SQUARE TUBE 2m | CST – THE COMPOSITES STORE, INC., 16330 HARRIS RD., HGR. #2 TEHACHAPI, CA 93561 | WOOD, OTHER PLASTIC | TRADITIONAL CF MFG |
| 230 | BOTTOM NUT | POLYCARBONATE CARBON FIBER FILAMENT | 3D PRINTED | | | CARBON FIBER, OTHER PLASTIC, WOOD | INJECTION MOLDING |
| 232 | TAILGUT | PLASTIC | PURCHASED | CELLO TAILGUT | NANTONG SINOMUSIC ENTERPRISE – JIANGSU, CHINA | | INJECTION MOLDING |
| 234 | TOP NUT | POLYCARBONATE CARBON FIBER FILAMENT | 3D PRINTED | | | CARBON FIBER, OTHER PLASTIC, WOOD | INJECTION MOLDING |

| | | | | | | | |
|---|---|---|---|---|---|---|---|
| 236 | ENDPIN | CARBON FIBER | PURCHASED | CELLO ENDPIN | NANTONG SINOMUSIC ENTERPRISE – JIANGSU, CHINA | METAL | |
| 238 | TOP BLOCK | POLYCARBONATE CARBON FIBER FILAMENT | 3D PRINTED | | | CARBON FIBER, OTHER PLASTIC, WOOD | INJECTION MOLDING |
| 240 | BOTTOM BLOCK | POLYCARBONATE CARBON FIBER FILAMENT | 3D PRINTED | | | CARBON FIBER, OTHER PLASTIC, WOOD | INJECTION MOLDING |
| 242 | SCREW FOR ADJUSTABLE SHOULDER | STEEL | PURCHASED | BINDING SCREWS FOR WOOD, BLACK, 1/4"–20, 1.575" THREAD LENGTH, 4.724" LONG, 0.669" HEAD | McMASTER–CARR 200 NEW CANTON WAY, ROBBINSVILLE TWP, NJ 08691 | | |
| 246 | FINGERBOARD | EBONY WOOD | PURCHASED | CELLO FINGERBOARD | LUOYANG JINQU INDUSTRY – HENAN, CHINA | CARBON FIBER, OTHER PLASTIC | INJECTION MOLDING |
| 248 | NUT FOR ADJUSTABLE SHOULDER | STEEL | PURCHASED | 18–8 STAINLESS STEEL SQUARE NUT, 1/4"–20 THREAD SIZE | McMASTER–CARR 200 NEW CANTON WAY, ROBBINSVILLE TWP, NJ 08691 | | |
| | GLUE | TWO–PART EPOXY | PURCHASED | PERMABOND MT3821 | CHEMICAL CONCEPTS, 410 PIKE ROAD, HUNTINGDON VALLEY, PA 19006 | | |

*FIG. 3 cont. 2*

LOW STRING HEIGHT
234

MEDIUM STRING HEIGHT
234

HIGH STRING HEIGHT
234

STRINGED INSTRUMENT

CROSS-REFERENCE TO RELATED APPLICATIONS

This application claims the benefit of the filing date of PCT patent application no. PCT/US22/72167, filed on May 6, 2022, which claims the benefit of U.S. provisional patent application No. 63/187,970, filed on May 13, 2021, the teachings of which application are incorporated herein by reference in their entirety.

BACKGROUND

Field of the Disclosure

The present disclosure relates to stringed instruments and, more specifically but not exclusively, to violins, violas, cellos, and double basses.

Description of the Related Art

This section introduces aspects that may facilitate a better understanding of the disclosure. The statements of this section are to be read in this light and are not to be understood as admissions about what is prior art or what is not prior art.

A conventional violin, viola, cello, or double bass has an inherently convex top and an inherently convex back with a (typically cylindrical) soundpost held in place between the top and back. The positioning of the soundpost affects the characteristics of the sound produced by the instrument. Tension in the strings pushes down on the bridge, which in turn pushes down on the top, causing the inherent convexity of the top to decrease slightly, which in turn causes the top to apply a compressive force to the soundpost that keeps the soundpost in place. If the tension in the strings is relaxed too much, then the inherent convexity of the top may result in the soundpost falling over due to the removal of the compressive force applied to the soundpost by the top and back. As a result, a professional luthier may be needed to reset the soundpost to its proper location between the top and the back.

FIGS. 1A and 1B are front and side views, respectively, of a conventional cello 100. The side view of FIG. 1B shows the convex shapes of the top 102 and back 104 of the cello 100 as well as indicating the positioning of the soundpost 106 between the top 102 and back 104 inside the cello body (i.e., the cello interior).

SUMMARY

According to certain embodiments of the disclosure, a stringed instrument having a soundpost, such as (without limitation) a violin, viola, cello, or double bass, has an inherently flat top and an inherently flat back when the strings are not under tension, instead of the convex top and back of a conventional stringed instrument having a soundpost. When tension is applied in the strings of such a stringed instrument of the present disclosure, the force applied by the bridge causes the otherwise flat top to have a slightly concave shape, which in turn applies a compressive force onto the soundpost which causes the otherwise flat back to have a slightly convex shape.

In some embodiments, a pair of retaining rings, whose inner diameters are slightly larger than the outer diameter of the soundpost, are mounted onto the inner surfaces of the top and back of the instrument at the optimal position for the soundpost, such that the mounted retaining rings receive the opposing ends of the soundpost. The height of the retaining rings is selected such that the soundpost will stay in place between the top and back of the instrument even when no tension is applied in the strings and the top and back of the instrument have their inherent flat shapes. In this way, the conventional problem of the soundpost falling over due to insufficient string tension is avoided.

In some embodiments, the instrument can be selectively configured with any of two or more interchangeable top nuts that can be used to achieve different string heights above the fingerboard.

In some embodiments, the instrument has an adjustable neck that can be used to achieve different string heights with or without an interchangeable top nut.

In some embodiments, the bottoms of the feet of the instrument's bridge are defined by collinear lines.

In some embodiments, the instrument's bass bar is straight.

In some embodiments, the instrument's back is not symmetric about its longitudinal centerline.

BRIEF DESCRIPTION OF THE DRAWINGS

Embodiments of the disclosure will become more fully apparent from the following detailed description, the appended claims, and the accompanying drawings in which like reference numerals identify similar or identical elements.

FIG. 3 presents Table I, which identifies labeled elements for the cello of FIGS. 2A and 2B;

FIG. 26 is a partial, side view of the cello of FIGS. 2A and 2B with the screw adjusted to achieve a relatively high string height of the strings over the fingerboard, while

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved. As used herein, the term "printed" means 3D printed using a suitable additive manufacturing technique.

Figure 2A:
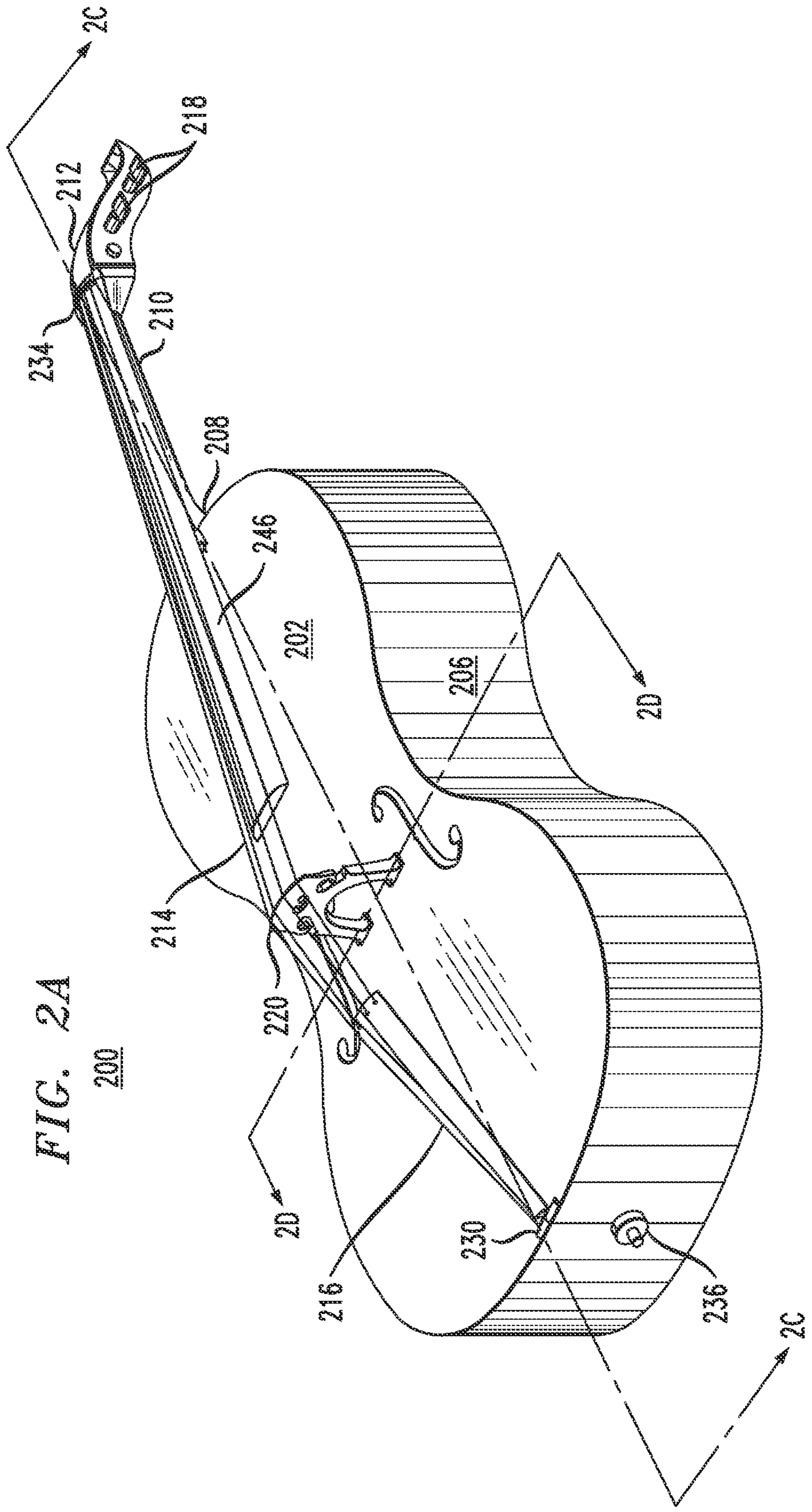
FIGS. 2A and 2B are perspective and exploded perspective views, respectively, of a cello according to one embodiment of the disclosure.
Figure 2B:
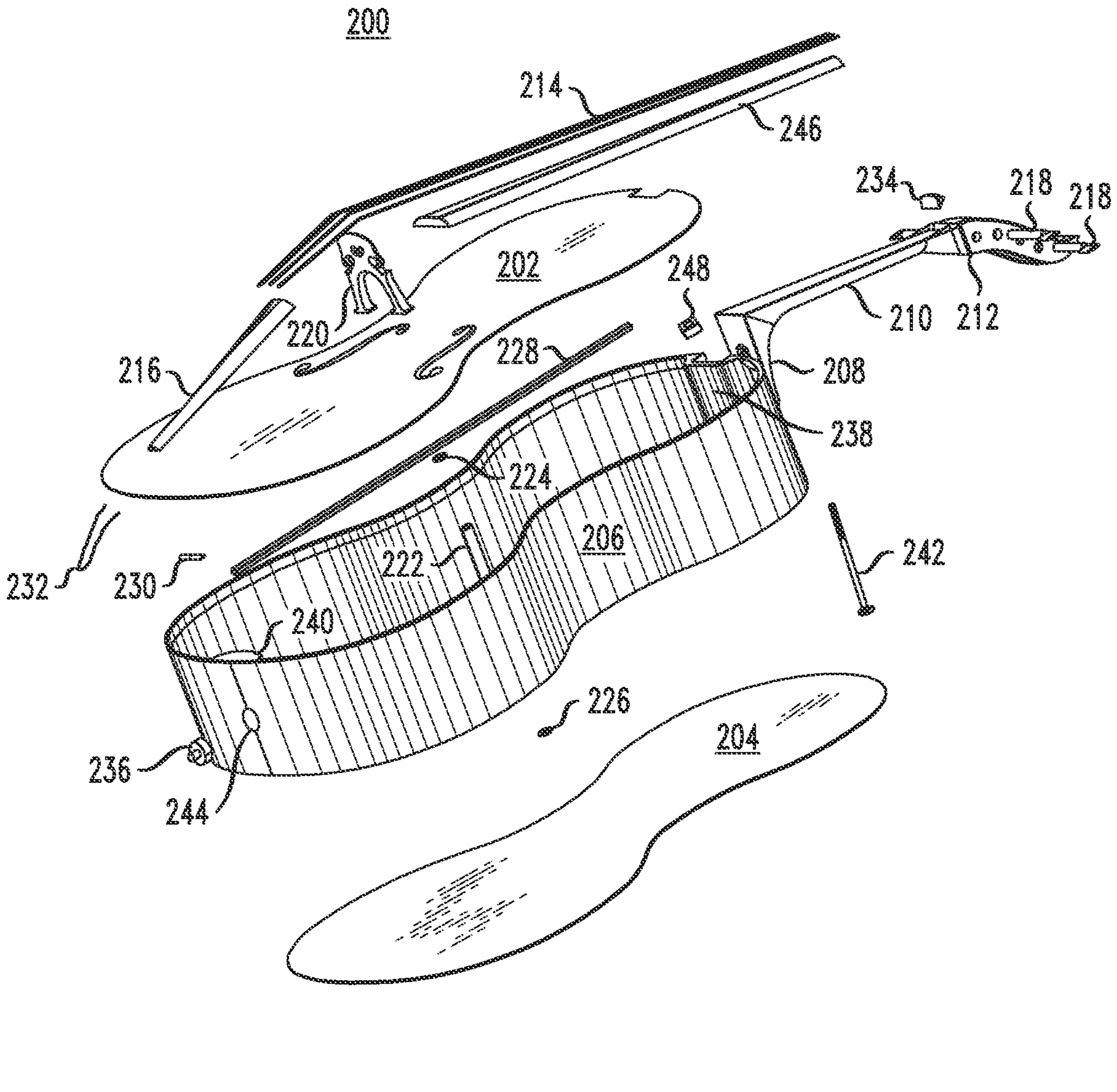

FIGS. 2A and 2B are perspective and exploded perspective views, respectively, of a cello 200 according to one embodiment of the disclosure. Although not shown in FIGS. 2A and 2B, the cello 200 can be played using a conventional bow.

FIG. 3 presents Table I, which identifies the names of the labeled elements for the cello 200 of FIGS. 2A and 2B, what materials those elements are made from in an example implementation of the cello 200, how those elements are manufactured or otherwise acquired in the example implementation, the part name and manufacturer of acquired elements in the example implementation, some example materials certain elements could be made from in alternative implementations of the cello 200, and some example methods for manufacturing those elements in alternative implementations.

For instance, in the example implementation, the top 202 and back 204 of the cello 200 are both custom made from carbon fiber sheets using computer numerical control (CNC) manufacturing at the Ningbo Haishu Lijing Plastic Equipment Factory in Ningbo, China, where the top 202 is preferably between 1 mm and 2 mm thick and the back is preferably between 0.5 mm and 2 mm thick. In alternative implementations, the top 202 and/or the back 204 may be 3D printed using polycarbonate carbon fiber-infused filament (CF). Alternatively, wood or a suitable plastic may be used for the top 202 and/or the back 204 utilizing other suitable manufacturing techniques.

Carbon fiber-infused filament may be used to increase the specific modulus of certain parts (e.g., the top 202, the back 204, the ribs 206, the heel 208, the neck 210, and the scroll 212). Additionally, the ribs 206 may be 3D printed in an efficient pattern using a single extrusion of plastic for each rib wall layer. The ribs 206 may be 3D printed as if the cello is lying down with its back against the print bed, forming the height of the ribs with each successive layer. The rib height of a traditional cello is about 12 cm. In certain implementations of the cello 200 of FIGS. 2A and 2B, the height of the ribs 206 is about 14.5 cm in order to give the bridge 220 approximately the same height as a traditional cello (taking into account the eventual concavity of the top 202 and the eventual convexity of the back 204), while also maintaining a similar total volume of air in the body of the instrument (i.e., the volume formed by the top 202, back 204, and ribs 206).

As shown in FIG. 2A, the inherent shapes of both the top 202 and the back 204 are flat. When the cello 200 is assembled and tension is applied in the strings 214 between the tailpiece 216 and the tuning pegs 218 at the scroll 212, the resulting downward force applied to the bridge 220 by the strings 214 causes the top 202 to become slightly concave, which in turn applies a downward force on the soundpost 222, which causes the back 204 to become slightly convex.

Figure 2C:
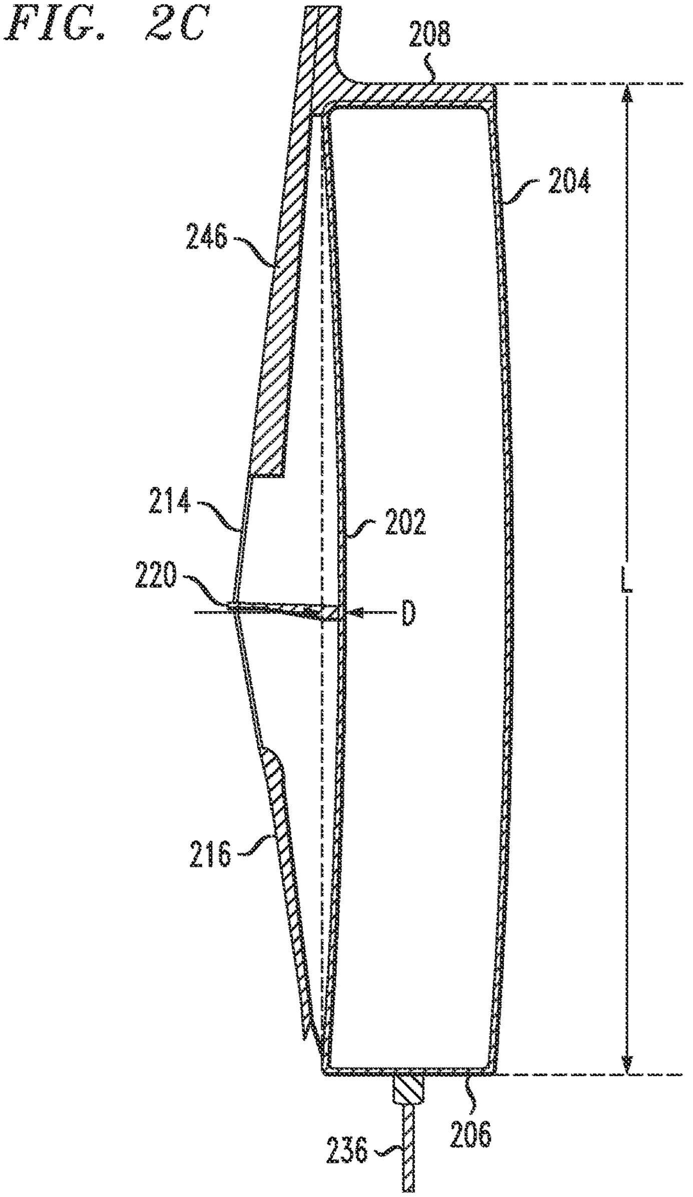
FIG. 2C is a cross-sectional side view of the cello 200 along the line 2C-2C of FIG. 2A demonstrating the concavity of the top.
Figure 2D:
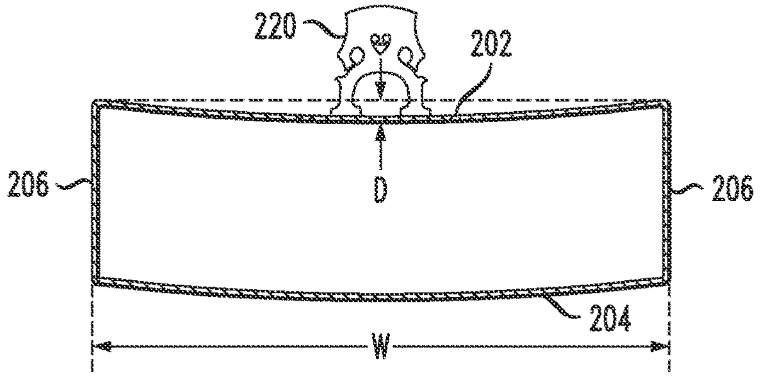
FIG. 2D is cross-section end view of the cello 200 along the line 2D-2D of FIG. 2A demonstrating the concavity of the top.

FIG. 2C is a cross-sectional side view of the cello 200 along the line 2C-2C of FIG. 2A demonstrating the concavity of the top. FIG. 2D is cross-section end view of the cello 200 along the line 2D-2D of FIG. 2A demonstrating the concavity of the top.

The concavity of the top of a stringed instrument of the present disclosure can be quantified in terms of the vertical displacement D between (i) a straight line drawn across the top from one edge of the instrument where the top meets the ribs to the opposing edge of the instrument where the line passes through the bridge and (ii) the point midway between the feet of the bridge with the instrument lying on its back. When no pressure is applied by the strings to the bridge and the top is flat, that vertical displacement D is zero. As pressure applied by the strings to the bridge increases such that the top becomes more concave, that vertical displacement D increases.

In some implementations of the cello 200, the vertical displacement D is greater than 1.5 mm. In some of those implementations, the vertical displacement D is greater than 2.0 mm, and, in some of those implementations, the vertical displacement D is greater than 2.5 mm.

For cello 200 having a body length L of 73.5 mm, the concavity can be represented in terms of a percentage of the body length L. Thus, in some implementations of the cello, the vertical displacement D is greater than 2.0 percent of the body length L. In some of those implementations, the vertical displacement D is greater than 2.7 percent of the body length L, and, in some of those implementations, the vertical displacement D is greater than 3.4 percent of the body length L. Note that, although the absolute vertical displacements D are expected to be different (i.e., violin, viola, cello and double bass from smallest to largest vertical displacements), the concavities of violins, violas, and double basses of the present disclosure are expected to have vertical displacements D with similar percentages of their different body lengths L.

Analogously, for cello 200 having a center bout width W of 23.25 mm, the concavity can be represented in terms of a percentage of the center bout width W. Thus, in some implementations of the cello, the vertical displacement D is greater than 6.5 percent of the center bout width W. In some of those implementations, the vertical displacement D is greater than 8.6 percent of the center bout width W, and, in some of those implementations, the vertical displacement D is greater than 10.8 percent of the center bout width W. Note that, here, too, the concavities of violins, violas, and double basses of the present disclosure are expected to have vertical displacements D with similar percentages of their different center bout widths W.

Figure 1A:
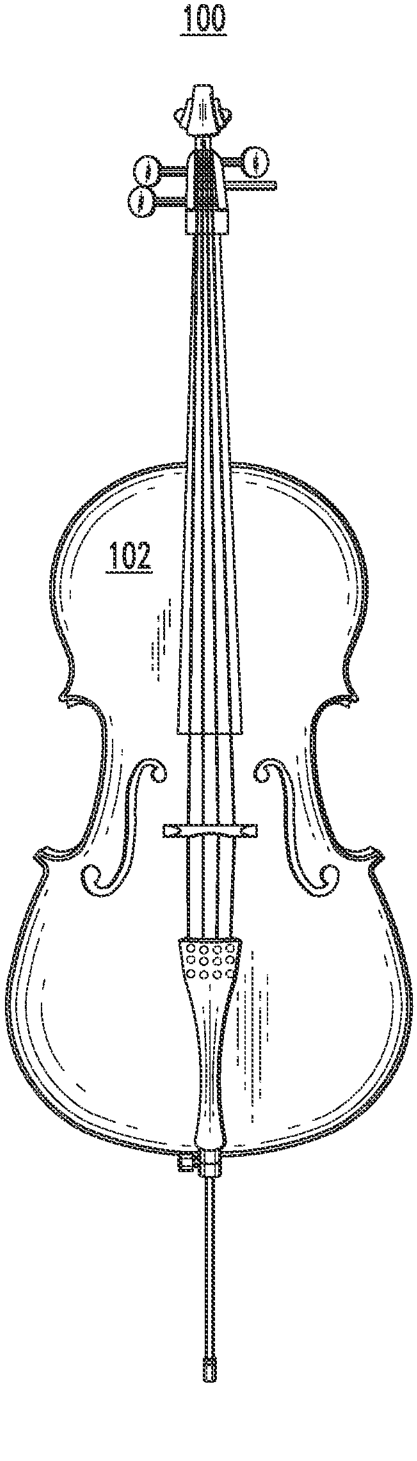
FIGS. 1A and 1B are front and side views, respectively, of a conventional cello.
Figure 1B:
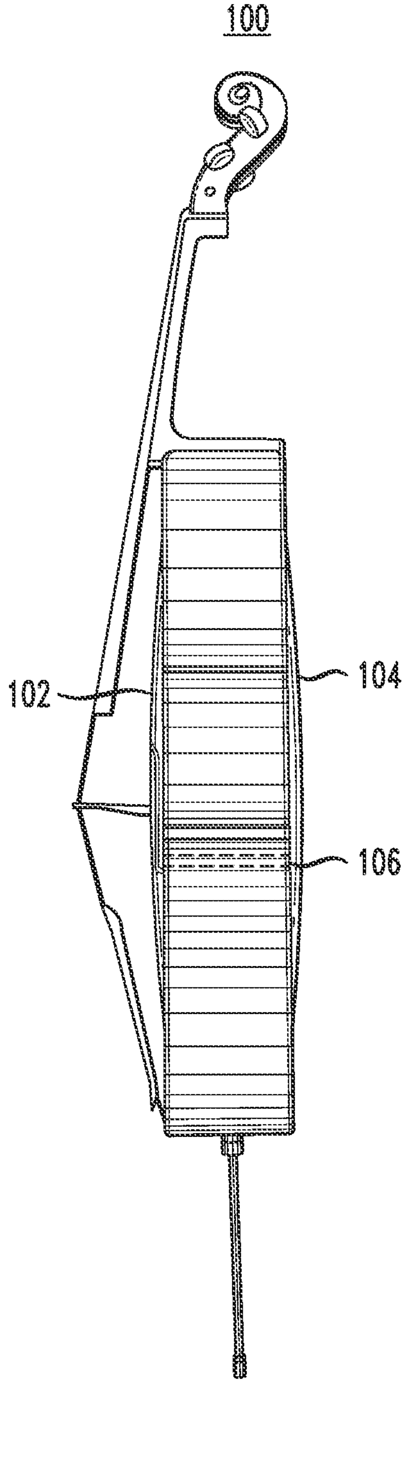
Figure 4A:
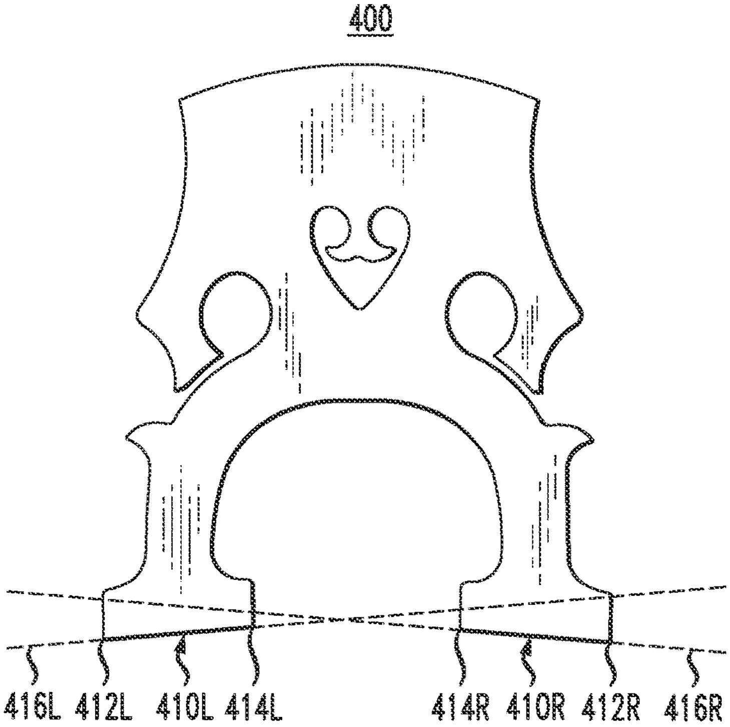
FIG. 4A PRIOR ART
FIG. 4A is a front view of a conventional bridge for a conventional cello, such as the cello of FIGS. 1A and 1B.

FIG. 4A is a front view of a conventional bridge 400 that is used with a conventional cello, such as the cello 100 of FIGS. 1A and 1B. As shown in FIG. 4A, the conventional bridge 400 has left and right "feet" 410L and 410R whose "toes" 412L/R are lower than their "heels" 414L/R to enable the bottoms of the feet 410L/R to sit flush on the convex outer surface of the cello top (e.g., 102 of FIGS. 1A and 1B). As shown in FIG. 4A, the line 416L corresponding to the bottom of the left foot 401L and the line 416R corresponding to the bottom of the right foot 401R are not collinear.

Figure 4B:
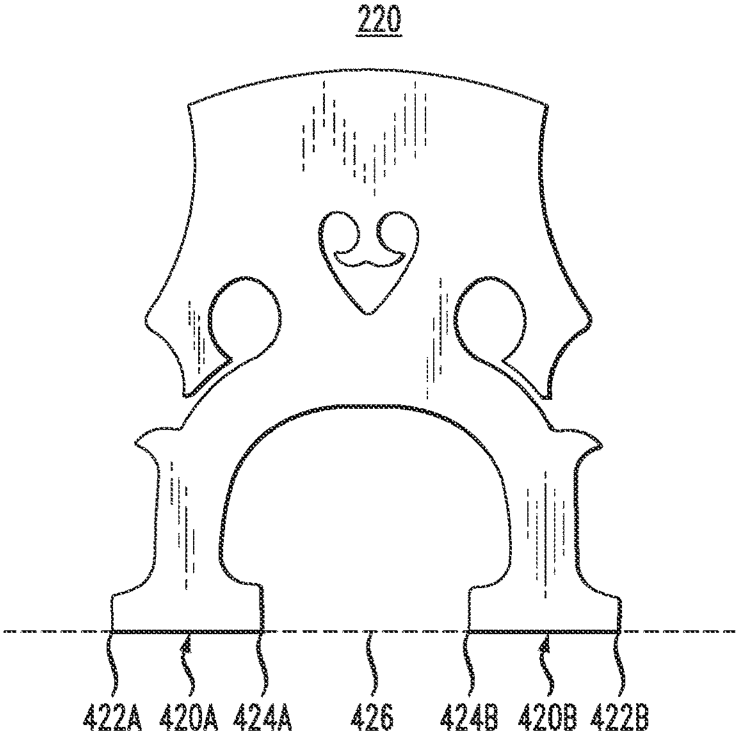
FIG. 4B is a front view of the bridge for the cello of FIGS. 2A and 2B.

FIG. 4B is a front view of the bridge 220 for the cello 200 of FIGS. 2A and 2B. Unlike the feet 410L/R of the conventional bridge 400 of FIG. 4A, the bottoms of the left and right feet 420A and 420B of the bridge 220 of FIG. 4B are collinear (with the line 426 corresponding to the bottoms of both feet 420A/B) to enable the feet 420 to sit flush on the outer surface of the inherently flat top 202 of the cello 200 of FIGS. 2A and 2B. To the extent that the top 202 become slightly concave when tension is applied in the strings 214, the downward force applied by the strings 214 onto the bridge 220 may cause the toes 422A/B and heels 424A/B of the feet 420A/B of the bridge 220 to deflect to maintain a substantially flush interface between the bottoms of the feet 420A/B and the slightly concave outer surface of the top 202.

Figure 5:
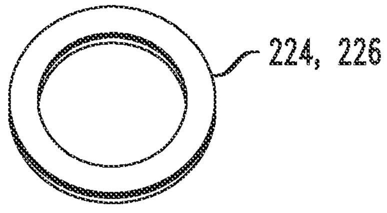
FIG. 5 is a perspective view of a retaining ring that may be used for each of the back and top retaining rings of the cello of FIGS. 2A and 2B.

FIG. 5 is a perspective view of a retaining ring that may be used for each of the top and back retaining rings 224 and 226 of the cello 200 of FIGS. 2A and 2B.

Figure 6:
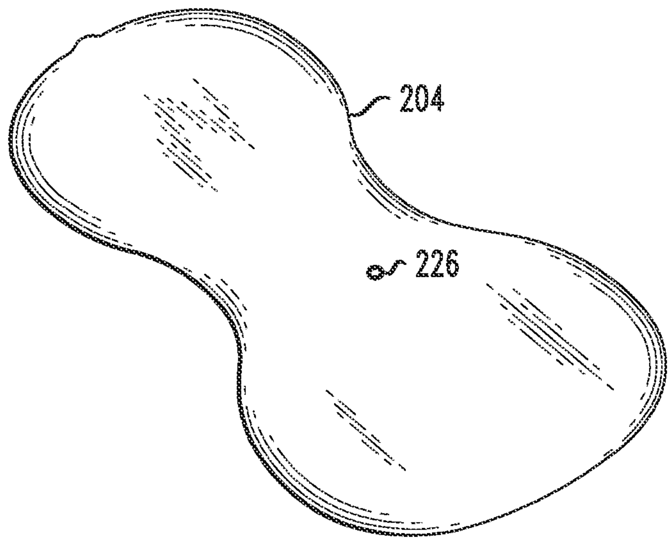
FIG. 6 is a perspective view of the inner surface of the back of the cello of FIGS. 2A and 2B with the back retaining ring mounted onto the inner surface of the back.

FIG. 6 is a perspective view of the inner surface of the back 204 of the cello 200 of FIGS. 2A and 2B with the back retaining ring 226 mounted onto the inner surface of the back 204 using a suitable glue, such as the two-part epoxy listed in Table I.

Figure 7:
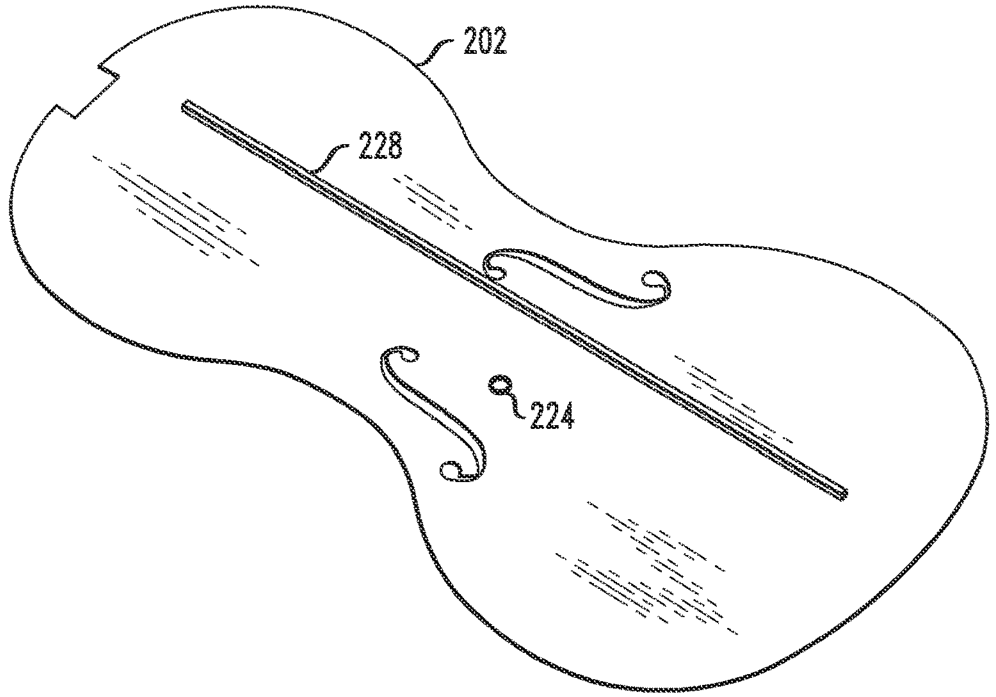
FIG. 7 is a perspective view of the inner surface of the top of the cello of FIGS. 2A and 2B with the top retaining ring and the bass bar mounted onto the inner surface of the top.

FIG. 7 is a perspective view of the inner surface of the top 202 of the cello 200 of FIGS. 2A and 2B with the top retaining ring 224 mounted onto the inner surface of the top 202 using a similar suitable glue. FIG. 7 also shows the bass bar 228 mounted onto the inner surface of the top 202 using a similar suitable glue.

Figure 8:
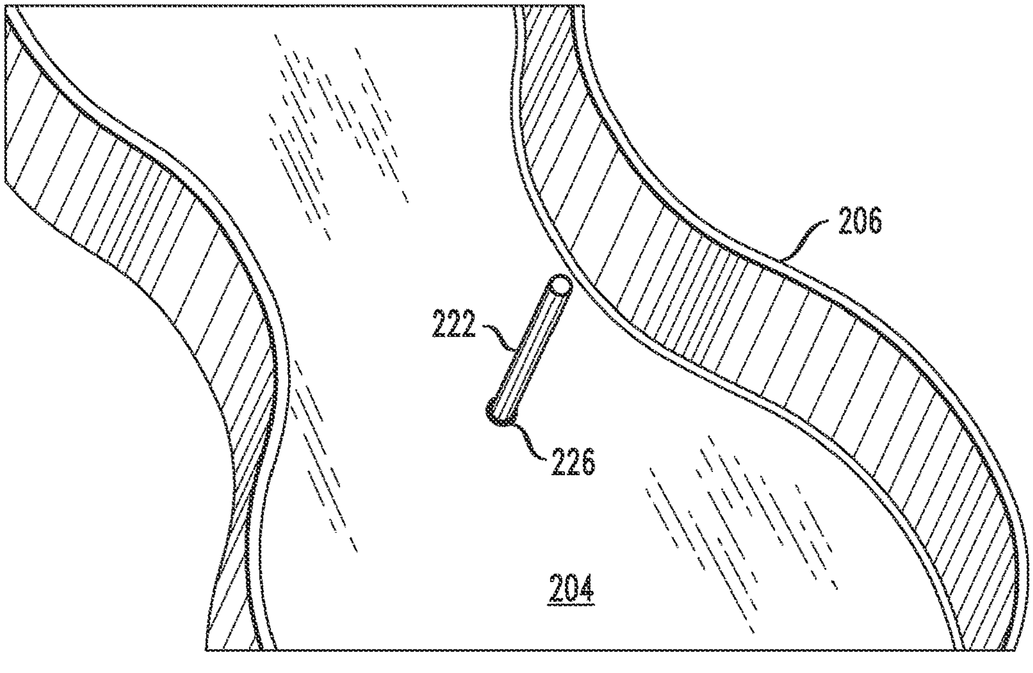
FIG. 8 is a perspective view of the soundpost inserted into the back retaining ring mounted onto the inner surface of the back of the cello of FIGS. 2A and 2B.

FIG. 8 is a perspective view of the soundpost 222 inserted into the back retaining ring 226 mounted onto the inner surface of the back 204.

In a traditionally constructed cello, when the strings are under tension, the soundpost is kept in place only by friction between the ends of the soundpost and the inner surfaces of the top and the back resulting from the compressive force applied by the bridge to the top and by the top to the soundpost. In the cello 200 of FIGS. 2A and 2B, even without that friction (e.g., when sufficient tension is removed from the strings 214), the soundpost 222 is kept in place by the top and back retaining rings 224 and 226. To achieve that function, the inner diameter of the retaining rings 224 and 226 is selected to be slightly larger than the outer diameter of the soundpost 222 so that the ends of the soundpost 222 can be inserted into the retaining rings 224 and 226. Furthermore, the heights of the retaining rings 224 and 226 are selected based on the distance between the top 202 and back 204 when the top 202 and back 204 have their inherently flat shapes such that the soundpost 222 stays in place within the retaining rings 224 and 226 even when no tension is applied in the strings 214.

In certain implementations, the length of the soundpost 222 is approximately the same as the height of the ribs 206, such that the top 202 and the back 204 will retain their inherently flat shapes when no force is applied by the bridge 220. When the bridge 220 does apply force to the top 202 as a result of tension in the strings 214, the top 202 will assume its slightly concave shape, which will result in the soundpost 222 applying force to cause the back to assume its slightly convex shape.

For a soundpost 222 having a cylindrical shape, at a minimum, the inner diameters of the top and back retaining rings 224 and 226 need to be the same as or slightly larger than the diameter of the soundpost 222 to enable the rings to receive the ends of the soundpost. In some implementations, the inner diameters of the top and back retaining rings 224 and 226 are significantly larger than the diameter of the soundpost 222 such that the soundpost 222 can be positioned at a variety of different locations within the retaining rings. In these implementations, the heights of these wider retaining rings 224 and 226 are sufficiently large to prevent the soundpost 222 from falling over when no pressure is applied by the bridge 220 and the top 202 and the back 204 have their inherently flat shapes. Those skilled in the art will understand that the minimum heights of the retaining rings 224 and 226 may be determined geometrically based on the inner diameters of the retaining rings 224 and 226, the length and diameter of the soundpost 222, and the height of the ribs 206 (i.e., the distance between the inner surfaces of the top 202 and the back 204).

In a conventional cello, the bass bar has an inherently curvilinear shape that matches the curvilinear shape of the inner surface of the convex cello top on which the bass bar is mounted. In certain implementations of cello 200 of FIGS. 2A and 2B, the bass bar 228 is an inherently straight, hollow rod having a square-shaped lateral cross section that resiliently flexes with the concavity of the top 202 when tension is applied in the strings 214. As a result, the bass bar 228 (FIG. 7) transfers some of the stress of that load to the perimeter of the top 202 where that stress can be distributed to the ribs 206. The concavity of the top 202 stretches the material of the top 202 pulling the top of the ribs 206 inward toward the center of the instrument. This is the opposite of what happens in a conventional cello when the strings are tightened where the convexity of the top is slightly decreased which causes the top to exert an outward force on the top of the ribs.

Furthermore, because the relatively thin top 202 and back 204 are both tented as a result of the tension applied in the strings 214, the top 202 and the back 204 function as stretched membranes, which increases the resonance of the cello 200 compared to traditionally made instruments where the tops and backs are substantially rigid, inherently load-bearing structures.

Figure 9:
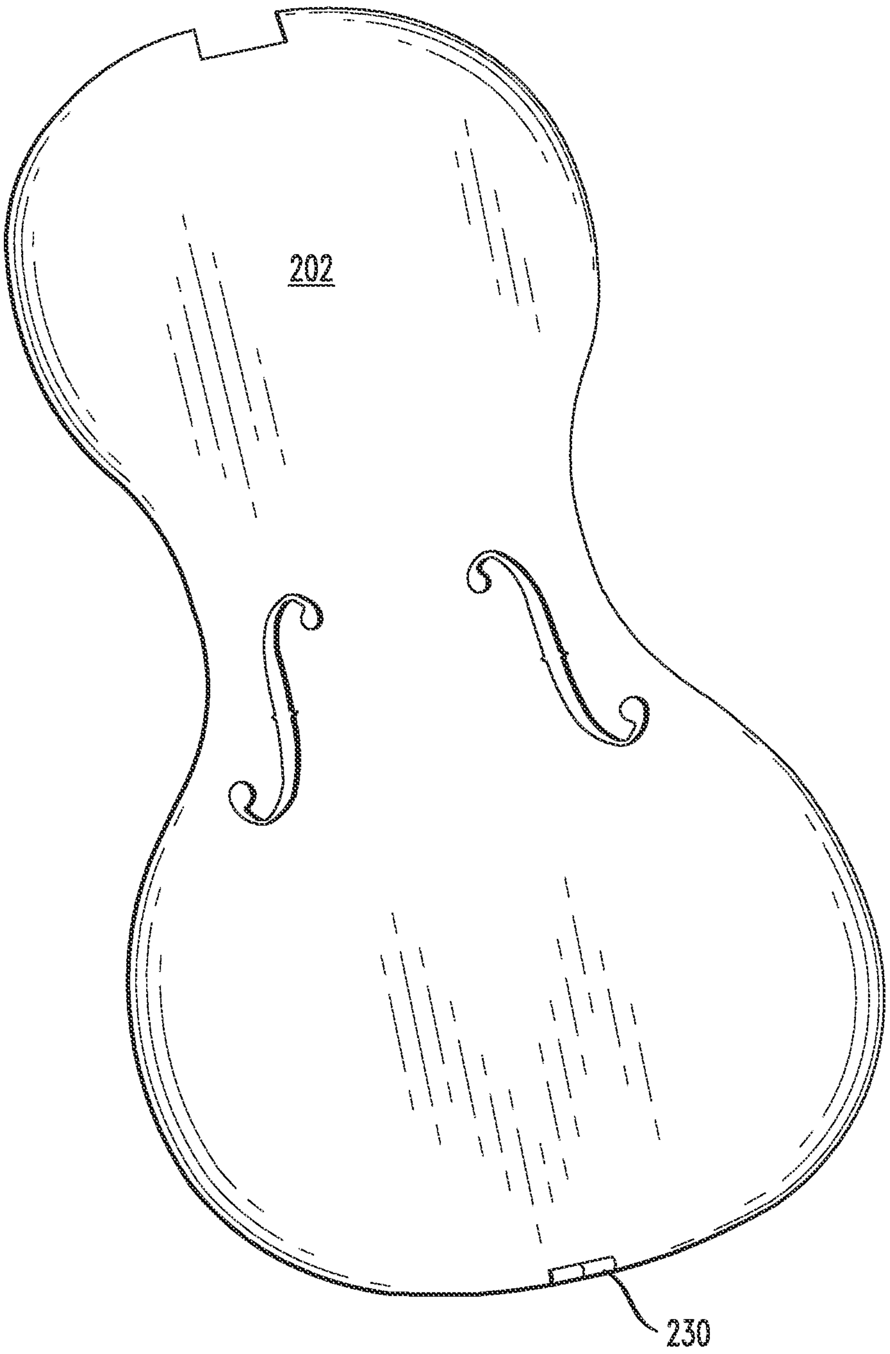
FIG. 9 is a perspective view of the outer surface of the top of the cello of FIGS. 2A and 2B with the bottom nut mounted onto the outer surface of the top.

FIG. 9 is a perspective view of the outer surface of the top 202 of the cello 200 of FIGS. 2A and 2B with the bottom nut 230 mounted onto the outer surface of the top 202 using a suitable glue. The bottom nut 230 acts to distribute the force of the tailgut 232 pushing against the top 202 and the ribs 206 of the cello 200. The bottom nut 230 also serves to smooth the almost 90-degree bend in the tailgut 232 over the top 202.

Figure 10:
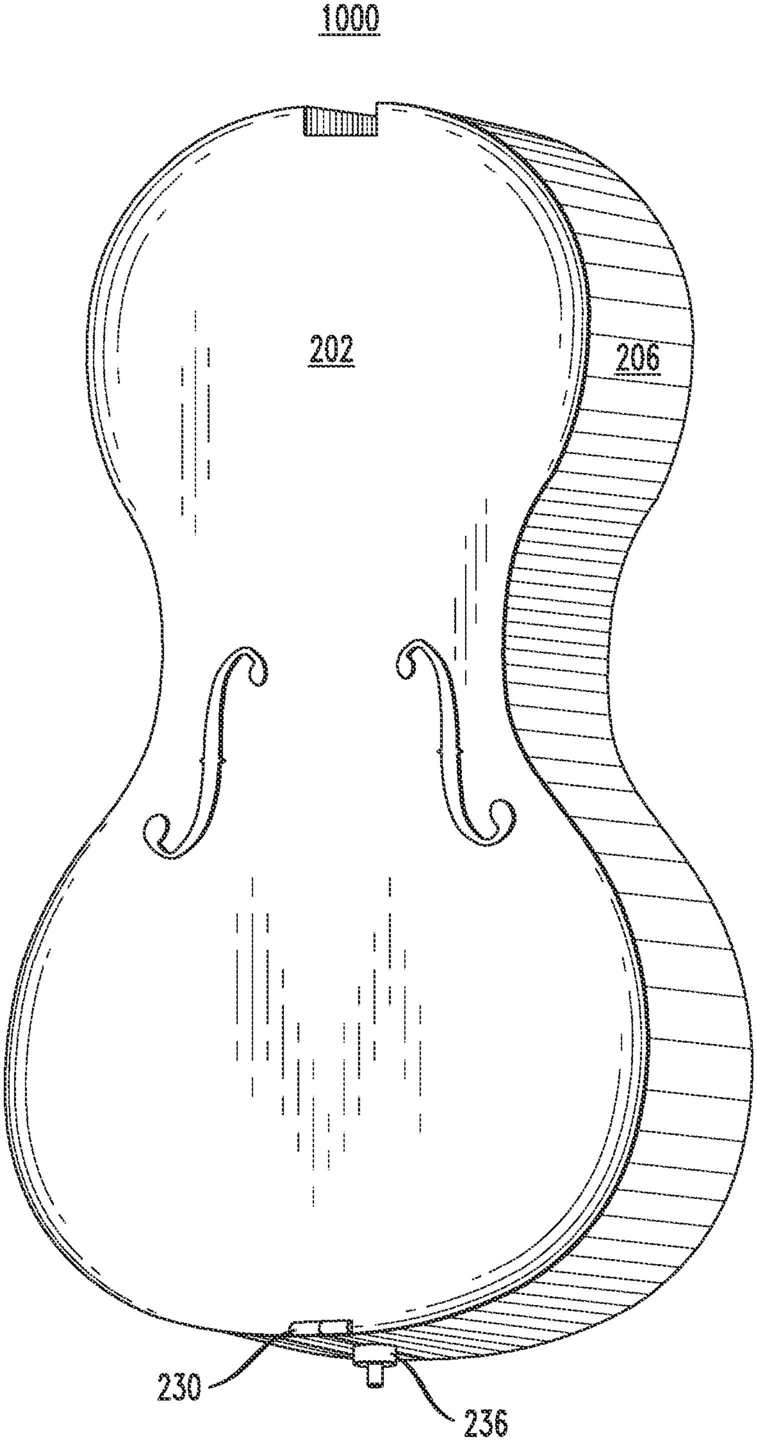
FIG. 10 is a perspective view of a first subassembly for the cello of FIGS. 2A and 2B.
Figure 11:
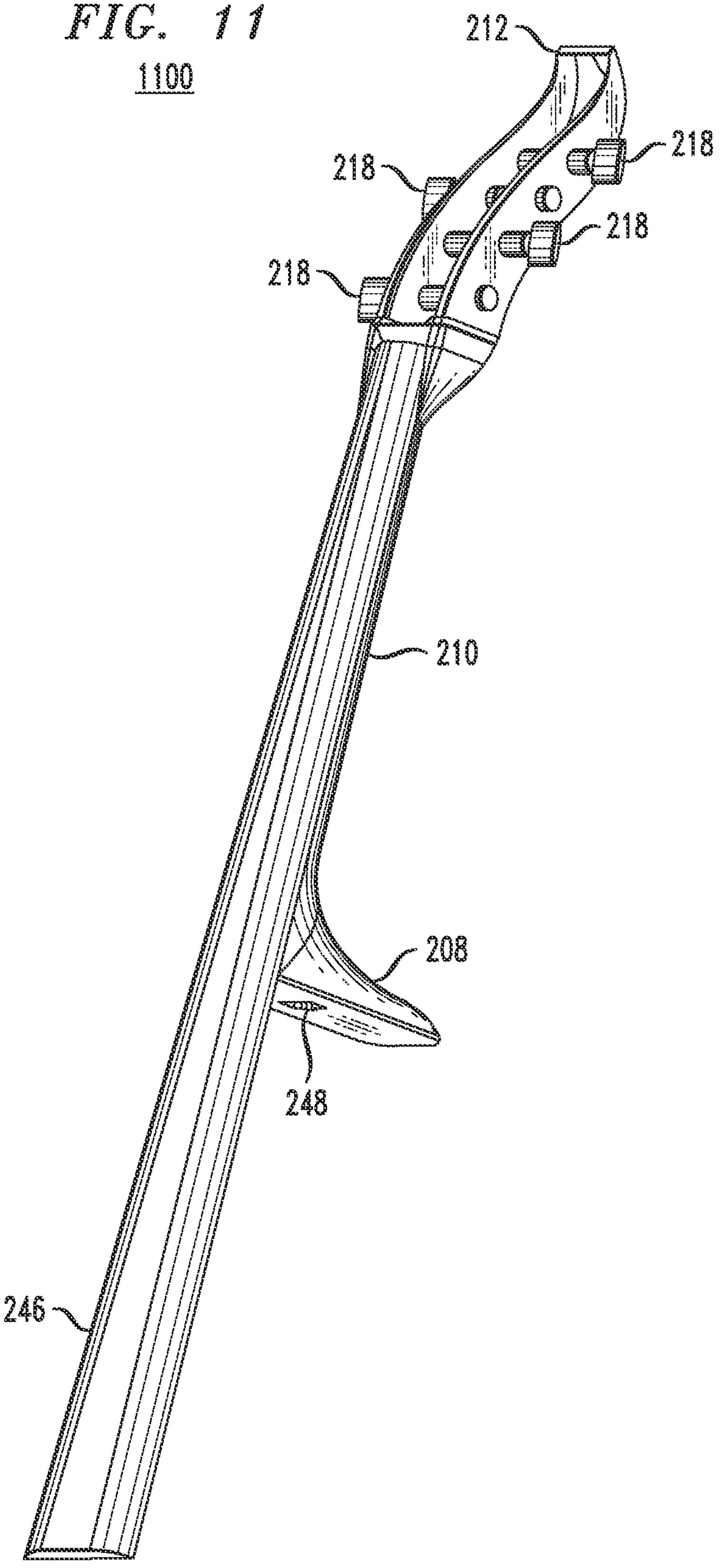
FIG. 11 is a perspective view of a second subassembly for the cello of FIGS. 2A and 2B.

In certain implementations, the cello 200 of FIGS. 2A and 2B may be partially assembled for efficient storage and/or shipping, such that the assembly of the cello 200 may be completed by the end user without requiring a professional luthier. In one such implementation, the partially assembled cello 200 comprises the following separate elements:

- The subassembly 1000 shown in FIG. 10;
- The subassembly 1100 shown in FIG. 11;
- The tailpiece 216 having (i) the tailgut 232 (conventionally) connected to and extending from the bottom end of the tailpiece 216 and (ii) the strings 214 (conventionally) connected to and extending from the top end of the tailpiece 216;
- The bridge 220; and
- The top nut 234.

As shown in FIG. 10, the subassembly 1000 includes the top 202, the ribs 206, the bottom nut 230, and the endpin 236. Also part of the subassembly 1000, but not visible in the view of FIG. 10, are the back 204, the top and back retaining rings 224 and 226, the soundpost 222, the bass bar 228, and the screw 242. Note that, in a conventional wooden cello, the top block and the bottom block are separate pieces of wood that are glued onto the ribs. In certain implementations of the cello 200 of FIGS. 2A and 2B, the top block 238 and the bottom block 240 shown in FIG. 2B are integral parts of the unitary structure that forms the ribs 206.

As known in the art, a conventional endpin, such as endpin 108 of FIGS. 1A and 1B, is long, thin, typically metal, carbon fiber, or wood structure that extends from the bottom of a cello (or double bass) that makes contact with the floor to support the weight of the instrument. In a conventional cello, the endpin can be retracted into the body of the cello for storage (as shown in FIG. 2A for endpin 236) and is secured in its extended configuration using a thumbscrew or other suitable tightening mechanism. The endpin 236 for the cello 200 of FIGS. 2A and 2B may be such a conventional endpin. Those skilled in the art will understand that, as depicted in FIG. 2B, the full length of the endpin 236 is not shown.

The subassembly 1000 of FIG. 10 may be assembled as follows:

- Step A1: Glue the back retaining ring 226 onto the inner surface of the back 204;
- Step A2: Glue the top retaining ring 224 and the bass bar 228 onto the inner surface of the top 202 and glue the bottom nut 230 onto the outer surface of the top 202;
- Step A3: As described later with respect to the adjustable neck feature of FIGS. 17-26, insert the screw 242 into a hole in the top block 238 of the ribs 206;
- Step A4: Glue the ribs 206 onto the back 204, thereby locking the screw 242 in place;
- Step A5: Glue the top 202 onto the ribs 206;
- Step A6: Insert and glue the endpin 236 into the endpin hole 244 (see FIG. 2B) in the bottom block 240 of the ribs 206; and
- Step A7: Insert the soundpost 222 through, e.g., the treble-side "f" hole in the top 202 and into first the back retaining ring 226 and then the top retaining ring 224 using, e.g., a surgical clamp. Note that, after inserting the bottom end of the soundpost 222 into the back retaining ring 226, downward force is applied to the soundpost 222 using the surgical clamp to temporarily tent the back 204 to achieve sufficient clearance to insert the top end of the soundpost 222 into the top retaining ring 224. When that downward force is removed, the back 204 will regain its inherently flat shape with the soundpost 222 secured in place within and between the top and back retaining rings 224 and 226.

As shown in FIG. 11, the subassembly 1100 includes the heel 208, the neck 210, the scroll 212, the tuning pegs 218, and the fingerboard 246. The subassembly 1100 of FIG. 11 may be assembled as follows:

- Step B1: Insert and glue the tuning pegs 218 into holes in the scroll 212;
- Step B2: As described later with respect to FIGS. 23 and 24, insert the nut 248 into the nut cavity 2302 in the heel 208, temporarily thread a screw (not shown) equivalent to the screw 242 of the subassembly 1000 into the nut 248 through the screw hole in the heel 208, and backfill the rest of the cavity 2302 with glue to secure the nut 248 in place. After the glue has partially dried, the screw is removed and the drying of the glue is allowed to be completed, leaving the nut 248 secured in place with its tapped opening ready to receive the screw 242 when the two subassemblies 1000 and 1100 are eventually interconnected; and
- Step B3 Glue the fingerboard 246 onto the neck 210.

Figure 25:
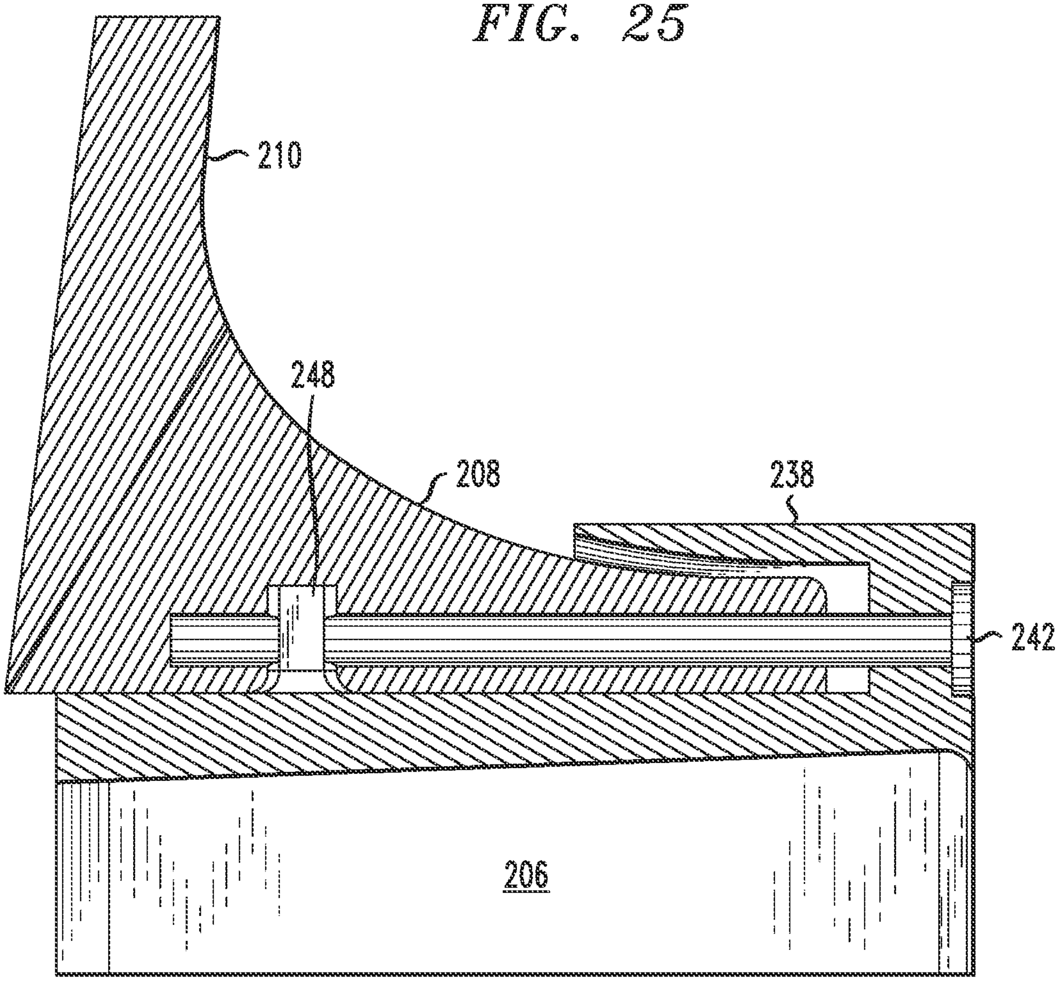
FIG. 25 is a partial, cross-sectional, side view showing the screw of the first subassembly of FIG. 10 engaging the nut of the second subassembly of FIG. 11.

The assembly of the cello 200 may then be completed as follows:

- Step C1: As shown in FIG. 25 described further below, interconnect the subassemblies 1000 and 1100 using the screw 242 (of subassembly 1000) and the nut 248 (of subassembly 1100);
- Step C2: Insert (without gluing) the top nut 234 into the nut opening 1202 (FIG. 12) in the scroll 212;
- Step C3: Thread the strings 214 through holes in the tuning pegs 218, which are then wound to secure the strings 214 in place;
- Step C4: Loop the tailgut 232 around the endpin 236 with the tailpiece 216 resting on the top 202; and
- Step C5: With the bridge 220 positioned between the strings 214 and the top 202, turn the tuning pegs 218 to apply tension in the strings 214, thereby securing the bridge 220 in place and resulting in both the (tented) concavity of the top 202 and the (tented) convexity of the back 204.

Interchangeable Top Nuts

Figure 12:
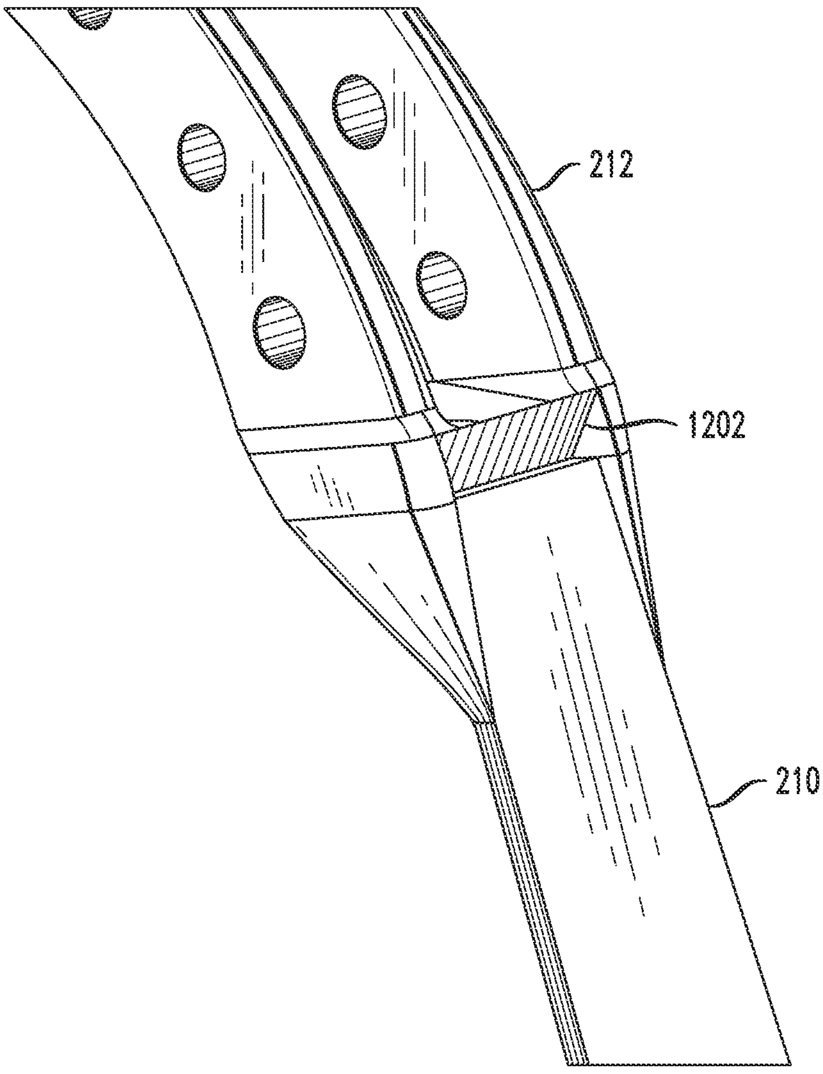
FIG. 12 is a perspective view of the opening in the scroll of the cell of FIGS. 2A and 2B for receiving a top nut.

FIG. 12 is a perspective view of the nut opening 1202 in the scroll 212 for receiving a top nut 234.

Figure 13:
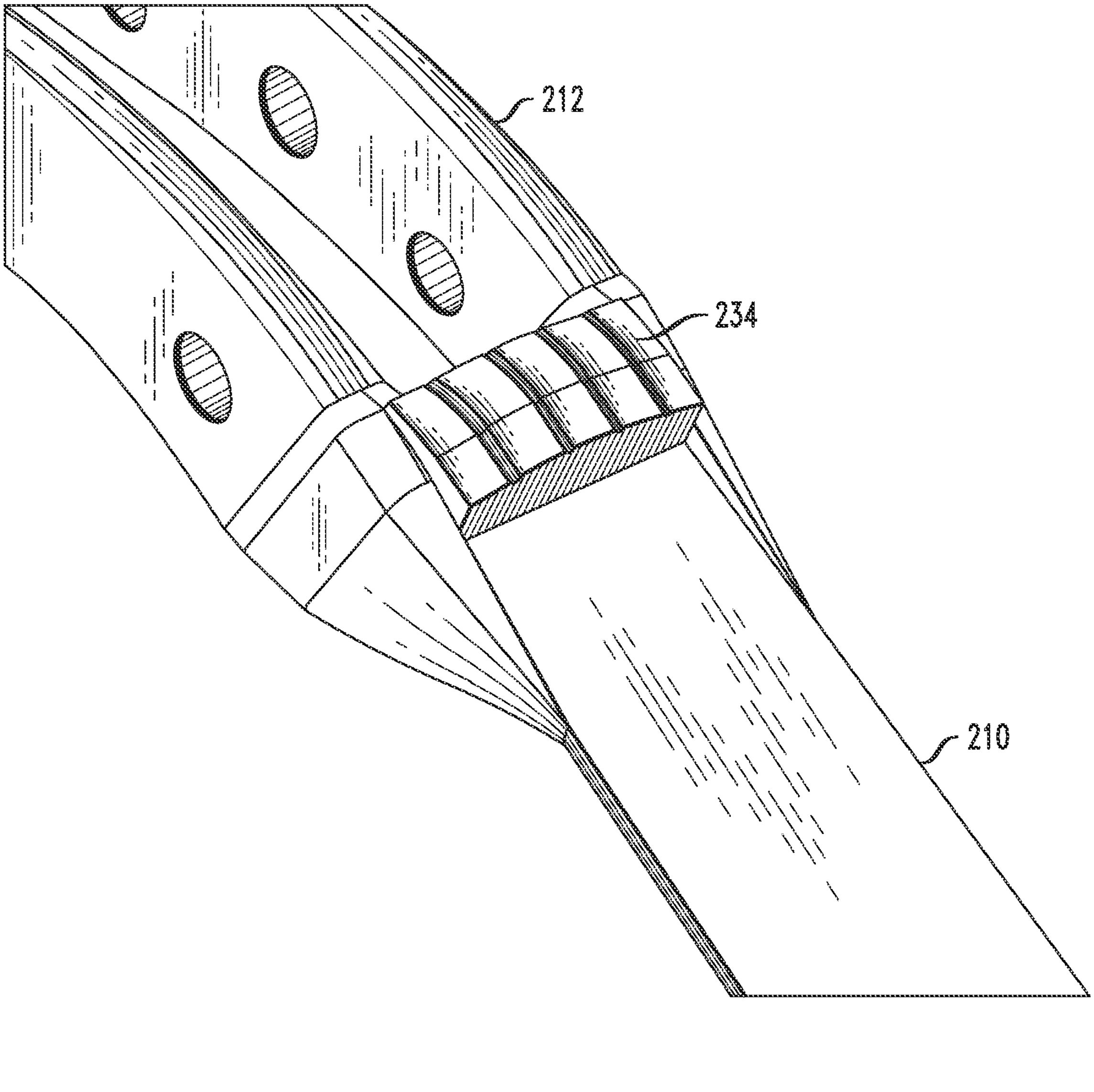
FIG. 13 is a perspective view of a top nut inserted into the nut-receiving opening in the scroll of the cell of FIGS. 2A and 2B.

FIG. 13 is a perspective view of a top nut 234 inserted into the nut opening 1202 in the scroll 212.

In some implementations of cello 200 of FIGS. 2A and 2B, because a top nut 234 is inserted into the scroll 212 without gluing those two elements together, top nuts of different sizes can be manufactured such that the top nut 234 is interchangeable to achieve different string heights above the fingerboard 246. In a conventional cello, the top nut is rigidly connected to the scroll such that the string height is fixed.

Figure 14A:
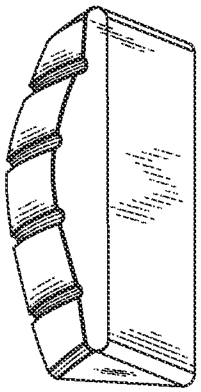
FIGS. 14A-14C are perspective views of top nuts of three different sizes that can be used interchangeably in the cello of FIGS. 2A and 2B to achieve different string heights above the fingerboard.
Figure 14B:
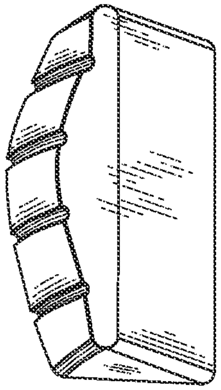
Figure 14C:
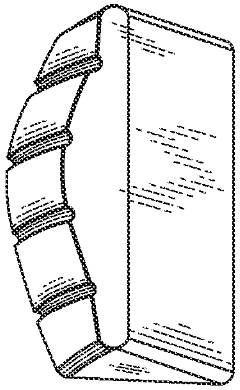

FIGS. 14A-14C are perspective views of top nuts 234 of three different sizes that can be used interchangeably in the cello 200 of FIGS. 2A and 2B to achieve different string heights above the fingerboard 246.

Note that the feature of interchangeable top nuts 234 may be applied to any suitable stringed instrument, including those without a soundpost and/or those without a concave top.

Adjustable Neck

As described previously, the subassemblies 1000 and 1100 of FIGS. 10 and 11 are connected together using the screw 242 of the subassembly 1000 and the nut 248 of the subassembly 1100. In some implementations of the cello 200 of FIGS. 2A and 2B, the screw 242 can be rotated one way or the other to move the heel-neck-and-scroll of the subassembly 1100 farther away from or closer to the strings 214 to achieve different string heights above the fingerboard 246. In a conventional cello, the heel-neck-and-scroll subassembly is rigidly connected to the top-ribs-and-back subassembly such that the string height is fixed. Note that this technique for adjusting string height can be implemented with or without the adjustment of string height achieved using interchangeable top nuts 234 as described above.

Figure 15:
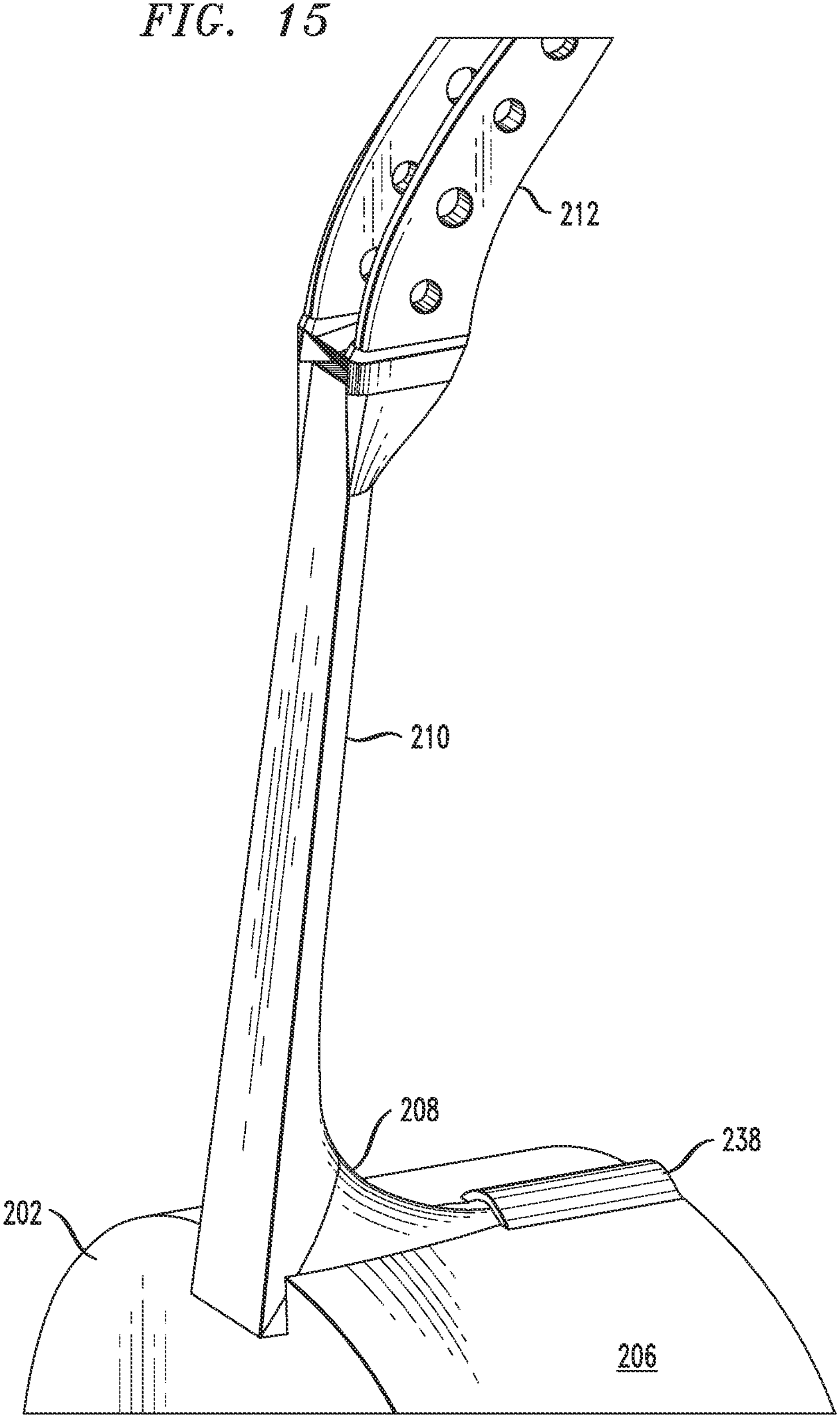
FIGS. 15 and 16 are partial, perspective views of the interconnected subassemblies of FIGS. 10 and 11 from the front side and from the back side, respectively.
Figure 16:
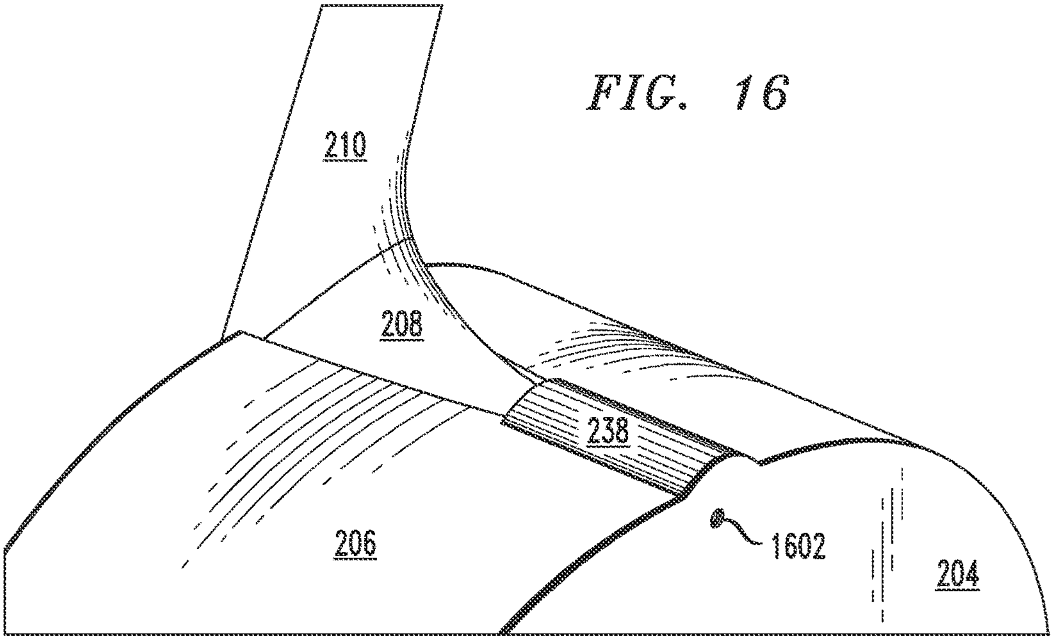

FIGS. 15 and 16 are partial, perspective views of the interconnected subassemblies 1000 and 1100 of FIGS. 10 and 11 from the front side and from the back side, respectively. As shown in FIG. 16, the back 204 has a hole 1602 that provides access to the screw 242 (not visible in FIG. 16) using, e.g., an Allen wrench.

Figure 17:
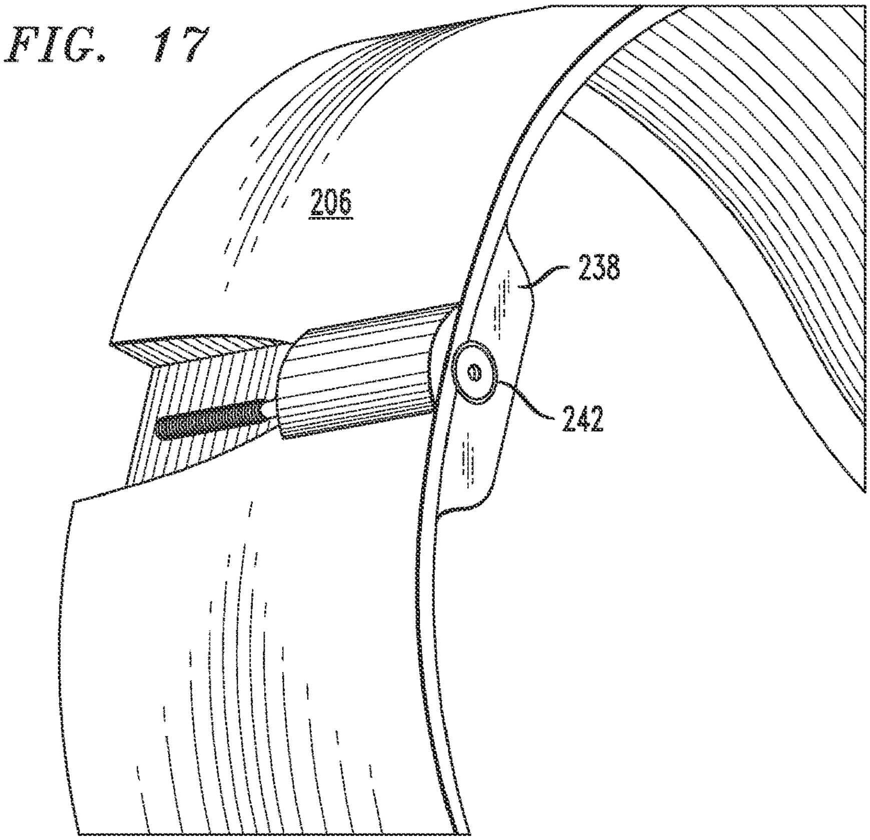
FIGS. 17 and 18 are partial, perspective views of the screw inserted into the hole in the top block of the ribs of the cello of FIGS. 2A and 2B from the back and front sides, respectively, before the back is glued onto the ribs.
Figure 18:
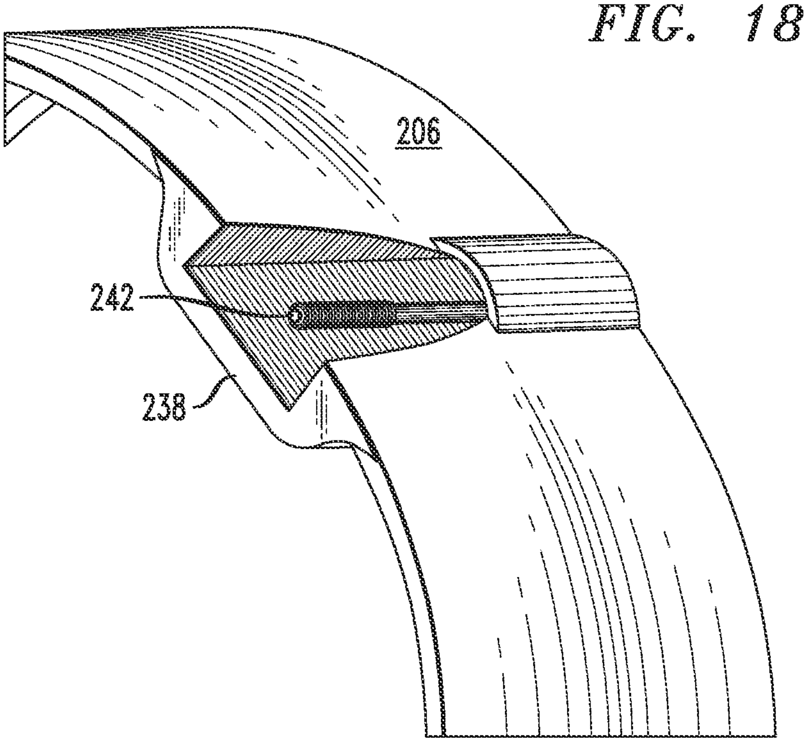

FIGS. 17 and 18 are partial, perspective views of the screw 242 inserted into the hole in the top block 238 of the ribs 206 from the back and front sides, respectively, before the back 204 is glued onto the ribs 206.

Figure 19:
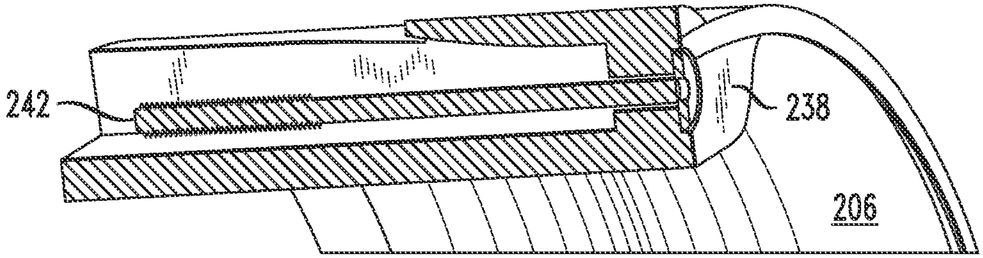
FIG. 19 is a partial, perspective, cross-sectional view of the screw inserted into the hole in the top block of the ribs of the cello of FIGS. 2A and 2B from the back side before the back is glued onto the ribs.

FIG. 19 is a partial, perspective, cross-sectional view of the screw 242 inserted into the hole in the top block 238 of the ribs 206 from the back side before the back 204 is glued onto the ribs 206.

Figure 20:
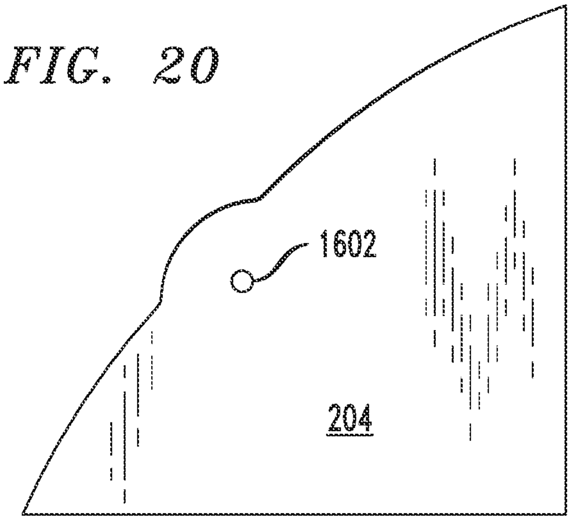
FIG. 20 is a partial, plan view showing the screw-access hole in the back of the cello of FIGS. 2A and 2B.

FIG. 20 is a partial, plan view showing the screw-access hole 1602 in the back 204.

Figure 21:
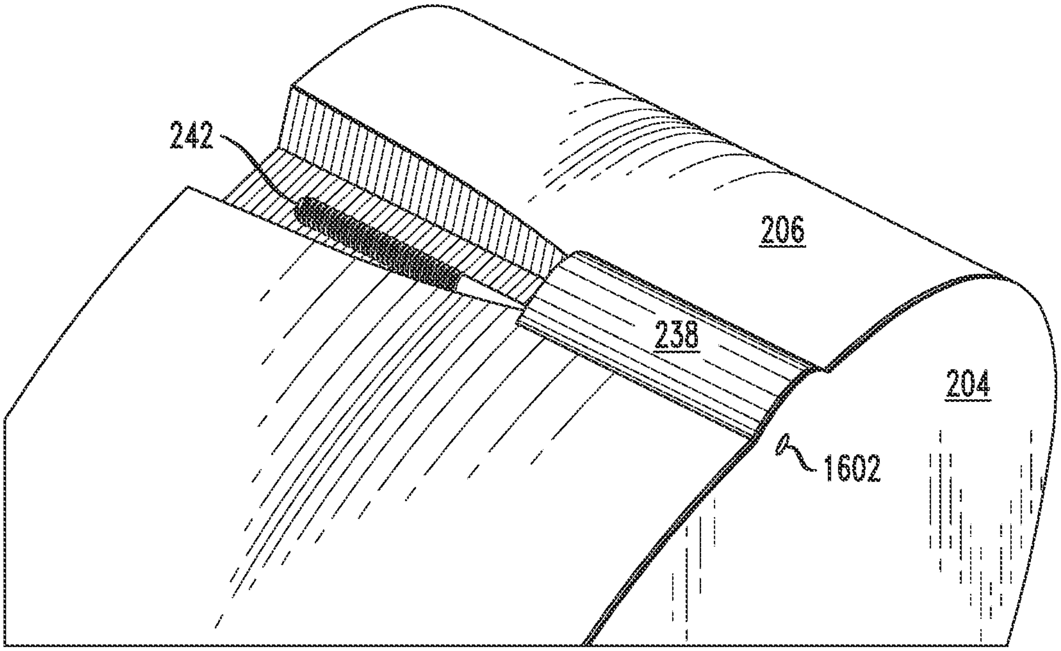
FIG. 21 is a partial, perspective view of the subassembly of FIG. 10 after the back has been glued onto the ribs, thereby securing the screw in place.

FIG. 21 is a partial, perspective view of the subassembly 1000 after the back 204 has been glued onto the ribs 206, thereby securing the screw 242 in place.

Figure 22:
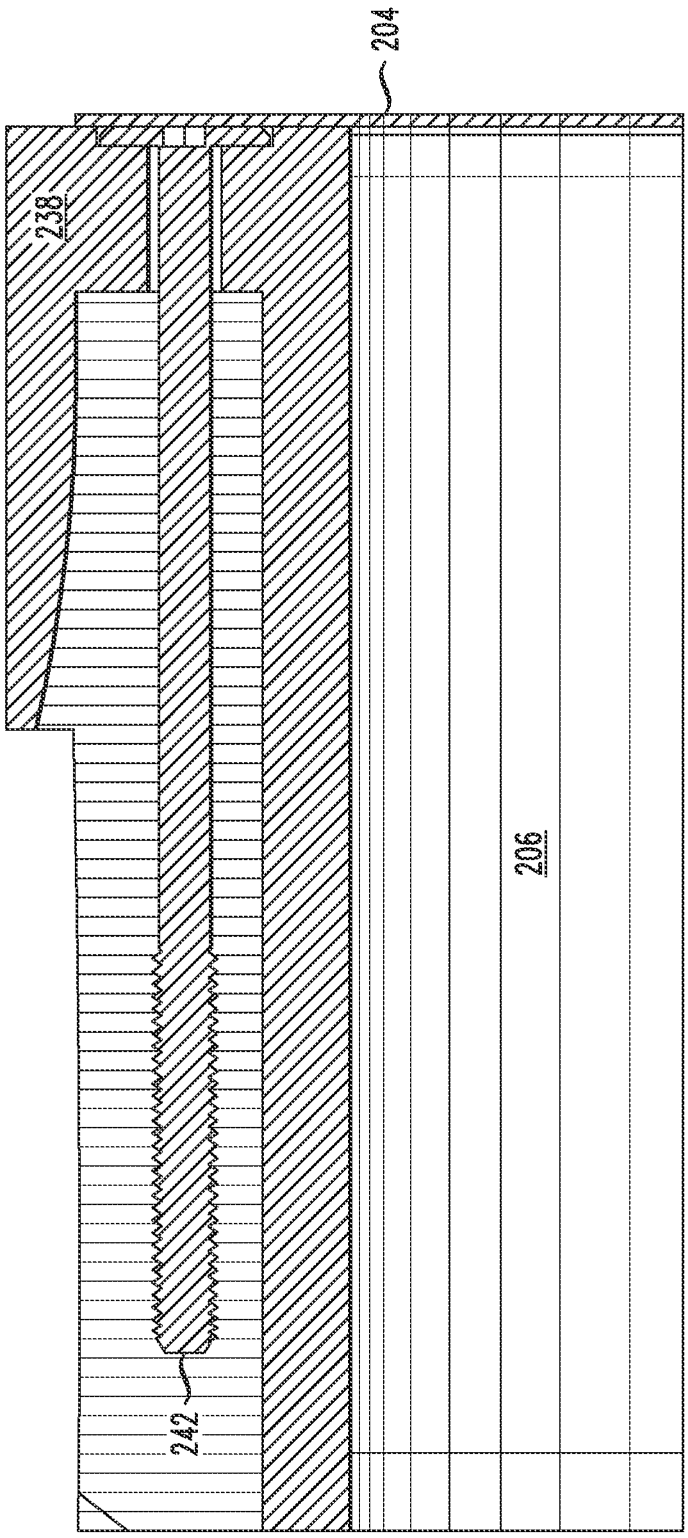
FIG. 22 is a partial, cross-sectional, side view of the subassembly of FIG. 10 showing the screw secured in place by the back.

FIG. 22 is a partial, cross-sectional, side view of the subassembly 1000 showing the screw 242 secured in place by the back 204.

Figure 23:
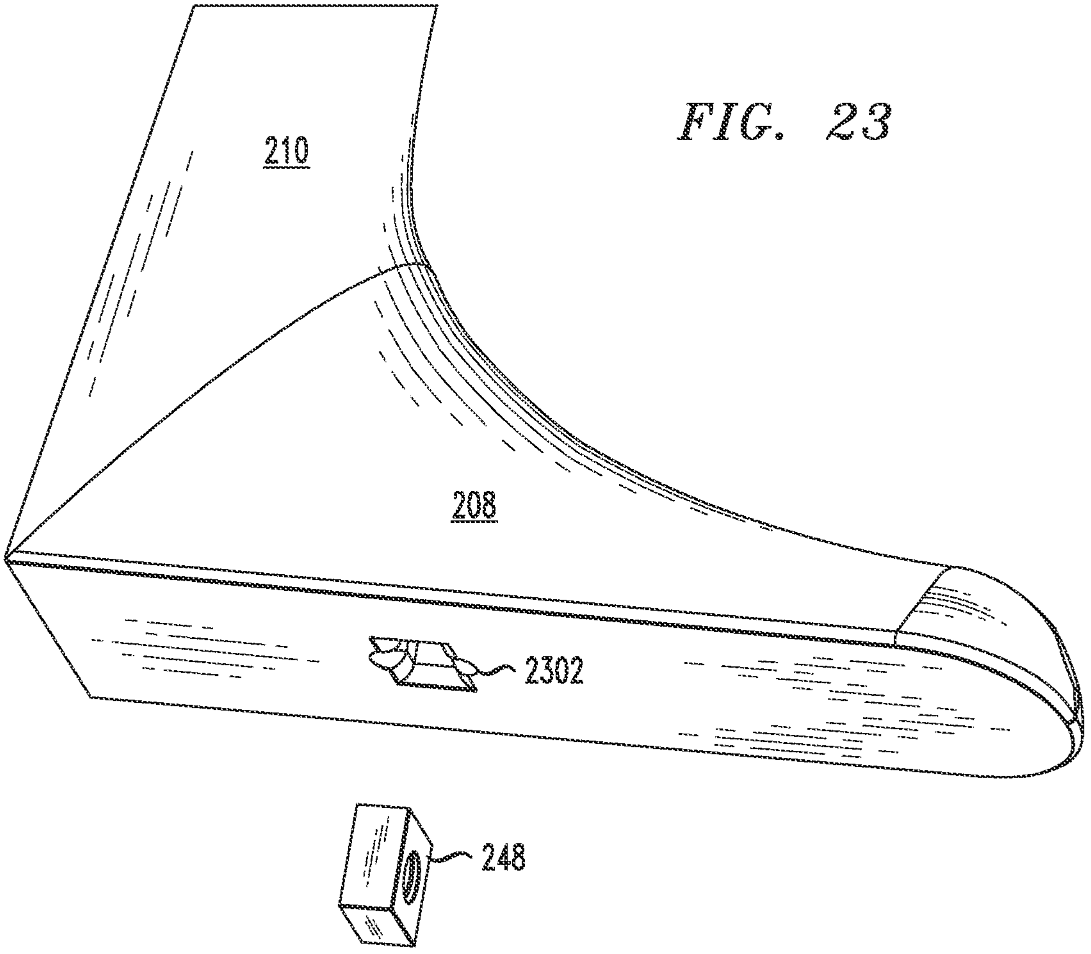
FIG. 23 is a partial, perspective view showing the cavity in the heel of the cello of FIGS. 2A and 2B for inserting the nut.

FIG. 23 is a partial, perspective view showing the nut cavity 2302 in the heel 208 for receiving the nut 248.

Figure 24:
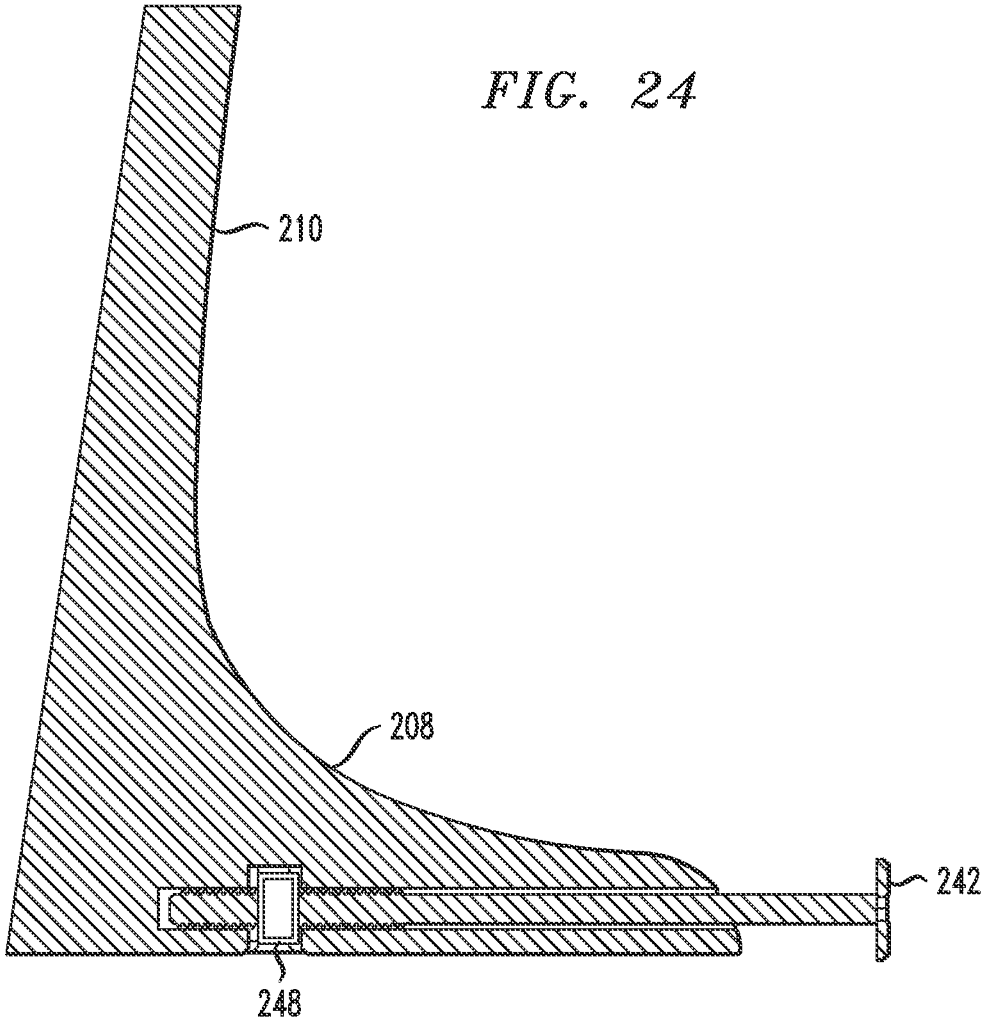
FIG. 24 is a partial, cross-sectional, side view showing the screw engaging the nut of the subassembly of FIG. 11.

FIG. 24 is a partial, cross-sectional, side view showing the screw 242 engaging the nut 248 of the subassembly 1100. Note that this view shows only the screw 242 and not any other elements of the subassembly 1000.

FIG. 25 is a partial, cross-sectional, side view showing the screw 242 of the first subassembly 1000 of FIG. 10 engaging the nut 248 of the second subassembly 1100 of FIG. 11.

Figure 27:
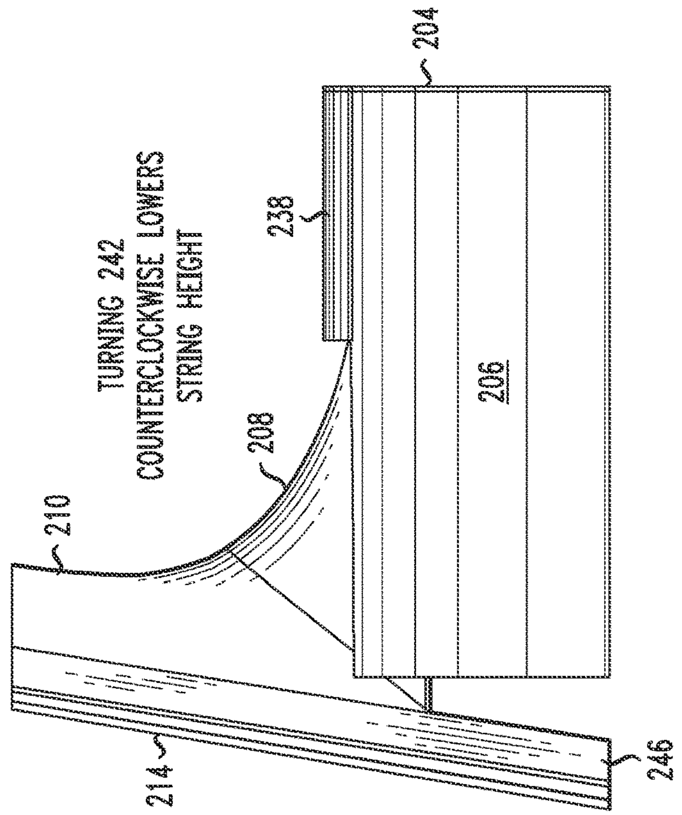
FIG. 27 is a partial, side view of the cello of FIGS. 2A and 2B with the screw adjusted to achieve a relatively low string height.
Figure 26:
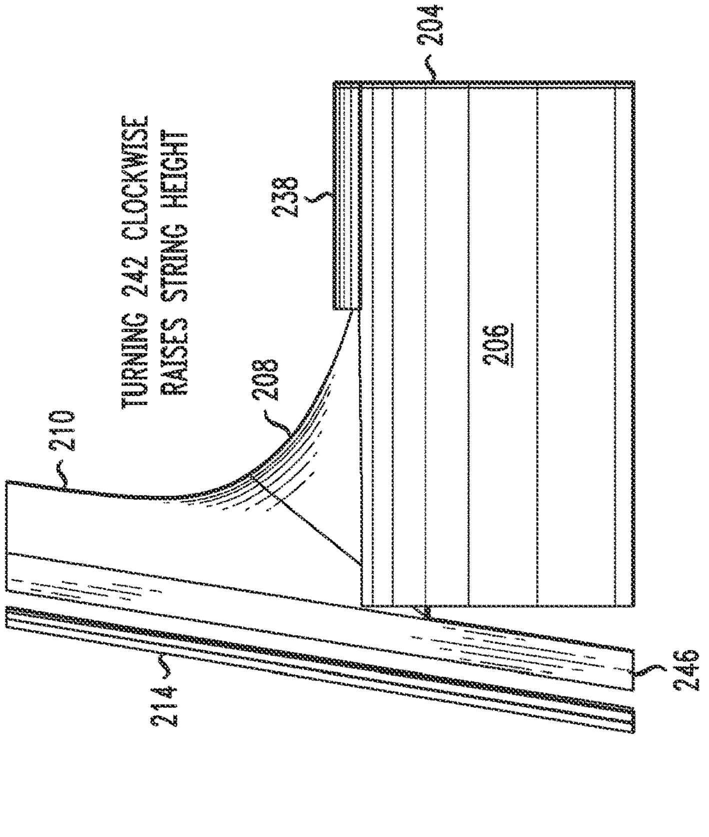

FIG. 26 is a partial, side view of the cello 200 of FIGS. 2A and 2B with the screw 242 (not shown) adjusted (e.g., rotated clockwise) to achieve a relatively high string height of the strings 214 over the fingerboard 246, while FIG. 27 is a partial, side view of the cello 200 of FIGS. 2A and 2B with the screw 242 (not shown) adjusted (e.g., rotated counter-clockwise) to achieve a relatively low string height.

Note that the feature of an adjustable neck may be applied to any suitable stringed instrument, including those without a soundpost and/or those without a concave top.

In alternative implementations of the cello 200 of FIGS. 2A and 2B, either the top 202 or the back 204 (but not both) may be manufactured (e.g., by 3D printing or injection molding) with the ribs 206 (along with the top block 238 and the bottom block 240) as a single unitary structure. Furthermore, one or more of the top retaining ring 224, the bass bar 228, and the bottom nut 230 may be manufactured with the top 202 as a single unitary structure. Similarly, the back retaining ring 226 may be manufactured with the back 204 as a single unitary structure. In addition, two or more of the heel 208, the neck 210, the scroll 212, and the fingerboard 246 may be manufactured as a single unitary structure.

Although embodiments have been described in which the soundpost 222 is cylindrical and the top and back retaining rings 224 and 226 have circular openings, as long as the ends of the soundpost can be positioned within the retaining rings without falling over, the soundpost and the openings of the retaining rings can have other appropriate shapes and sizes.

Although the disclosure has been described in the context of the cello 200 of FIGS. 2A and 2B, those skilled in the art will understand that embodiments of the present disclosure can be implemented in the context of any stringed instrument having a soundpost, such as (without limitation) violins, violas, and double basses. In addition, embodiments of the present disclosure, e.g., those having interchangeable nuts and/or adjustable necks can also be implemented in the context of stringed instruments that do not have soundposts, such as (without limitation) guitars.

Although embodiments have been described in which the retaining rings 224 and 226 are mounted onto the inner surfaces of the inherently flat top 202 and the inherently flat back 204 of the cello 200 of FIGS. 2A and 2B, it will be understood by those skilled in the art that analogous retaining rings could be mounted onto the inner surfaces of the top and back of a stringed instrument having a convex top and a convex back. Such retaining rings could provide the same benefit of avoiding soundpost displacement in otherwise conventional stringed instruments.

In certain embodiments, the present disclosure is a musical instrument configured to receive strings and a bridge, the instrument comprising (i) a back separated from a top by a rib structure to define an interior of the instrument and (ii) a soundpost within the interior and spanning between an inner surface of the back and an inner surface of the top. The instrument is configured to receive the bridge positioned between the strings and an outer surface of the top to support the strings over the top. The top and back are inherently flat. When tension is applied in the strings such that the bridge applies force to the top and the soundpost applies force to the back, the top acquires a concave shape and the back acquires a convex shape.

In at least some of the above embodiments, the instrument further comprises the strings and the bridge.

In at least some of the above embodiments, the concavity of the top and the convexity of the back increase as the strings are tightened over the bridge.

In at least some of the above embodiments, the top has a top retaining ring at a location on the inner surface of the top; the back has a back retaining ring at a location on the inner surface of the back, wherein the location of the back retaining ring corresponds to the location of the top retaining ring; and a first end the soundpost is positioned within the top retaining ring and a second end of the soundpost is positioned within the back retaining ring.

In at least some of the above embodiments, the top and back retaining rings have cylindrical shapes.

In at least some of the above embodiments, when the top and back have their inherently flat shapes, the top and back retaining rings keep the soundpost in place between the inner surface of the back and the inner surface of the top.

In at least some of the above embodiments, the instrument further comprises an inherently straight bass bar mounted onto the inner surface of the top.

In at least some of the above embodiments, the bridge has feet having inherently collinear bottoms.

In at least some of the above embodiments, tension in the strings induces an inward pulling force on the rib structure where the top meets the rib structure.

In at least some of the above embodiments, the instrument further comprises a neck having a nut opening configured to receive any one of a number of different top nuts of different sizes to achieve different string heights for the instrument.

In at least some of the above embodiments, the instrument comprises (i) a first subassembly comprising the back, top, rib structure, and soundpost and (ii) a second subassembly comprising the instrument's heel, neck, scroll, tuning pegs, and fingerboard, wherein the first subassembly further comprises a screw that engages with a nut of the second subassembly to interconnect the first and second subassemblies.

In at least some of the above embodiments, the screw can be rotated to achieve different string heights in the instrument.

In at least some of the above embodiments, the instrument is a cello, and, when the cello is assembled, the top has a vertical displacement from its inherent flat shape at the location of the bridge of at least 1.5 mm.

In at least some of the above embodiments, when the cello is assembled, the vertical displacement of the top from its inherent flat shape at the location of the bridge is at least 2.0 mm.

In at least some of the above embodiments, when the cello is assembled, the vertical displacement of the top from its inherent flat shape at the location of the bridge is at least 2.5 mm.

In at least some of the above embodiments, when the instrument is assembled, the top has a vertical displacement from its inherent flat shape at the location of the bridge of at least 2.0 percent of the instrument's body length.

In at least some of the above embodiments, when the instrument is assembled, the vertical displacement of the top from its inherent flat shape at the location of the bridge is at least 2.7 percent of the instrument's body length.

In at least some of the above embodiments, when the instrument is assembled, the vertical displacement of the top from its inherent flat shape at the location of the bridge is at least 3.4 percent of the instrument's body length.

In at least some of the above embodiments, when the instrument is assembled, the top has a vertical displacement from its inherent flat shape at the location of the bridge of at least 6.5 percent of the instrument's center bout width.

In at least some of the above embodiments, when the instrument is assembled, the vertical displacement of the top from its inherent flat shape at the location of the bridge is at least 8.6 percent of the instrument's center bout width.

In at least some of the above embodiments, when the instrument is assembled, the vertical displacement of the top from its inherent flat shape at the location of the bridge is at least 10.8 percent of the instrument's center bout width.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this disclosure may be made by those skilled in the art without departing from embodiments of the disclosure encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

What is claimed is:

1. A musical instrument configured to receive strings and a bridge, the instrument comprising:

a back separated from a top by a rib structure to define an interior of the instrument; and a soundpost within the interior and spanning between an inner surface of the back and an inner surface of the top, wherein:

the instrument is configured to receive the bridge positioned between the strings and an outer surface of the top to support the strings over the top;

the top and back are inherently flat;

when tension is applied in the strings such that the bridge applies force to the top and the soundpost applies force to the back, the top acquires a concave shape and the back acquires a convex shape.

2. The instrument of claim 1, further comprising the strings and the bridge.

3. The instrument of claim 1, wherein the concavity of the top and the convexity of the back increase as the strings are tightened over the bridge.

4. The instrument of claim 1, wherein:

the top has a top retaining ring at a location on the inner surface of the top;

the back has a back retaining ring at a location on the inner surface of the back, wherein the location of the back retaining ring corresponds to the location of the top retaining ring; and a first end the soundpost is positioned within the top retaining ring and a second end of the soundpost is positioned within the back retaining ring.

5. The instrument of claim 4, wherein the top and back retaining rings have cylindrical shapes.

6. The instrument of claim 4, wherein, when the top and back have their inherently flat shapes, the top and back retaining rings keep the soundpost in place between the inner surface of the back and the inner surface of the top.

7. The instrument of claim 1, further comprising an inherently straight bass bar mounted onto the inner surface of the top.

8. The instrument of claim 1, wherein the bridge has feet having inherently collinear bottoms.

9. The instrument of claim 1, wherein tension in the strings induces an inward pulling force on the rib structure where the top meets the rib structure.

10. The instrument of claim 1, further comprising a neck having a nut opening configured to receive any one of a number of different top nuts of different sizes to achieve different string heights for the instrument.

11. The instrument of claim 1, wherein the instrument comprises:

a first subassembly comprising the back, top, rib structure, and soundpost; and a second subassembly comprising the instrument's heel, neck, scroll, tuning pegs, and fingerboard, wherein the first subassembly further comprises a screw that engages with a nut of the second subassembly to interconnect the first and second subassemblies.

12. The instrument of claim 11, wherein the screw can be rotated to achieve different string heights in the instrument.

13. The instrument of claim 1, wherein:

the instrument is a cello; and when the cello is assembled, the top has a vertical displacement from its inherent flat shape at the location of the bridge of at least 1.5 mm.

14. The instrument of claim 13, wherein, when the cello is assembled, the vertical displacement of the top from its inherent flat shape at the location of the bridge is at least 2.0 mm.

15. The instrument of claim 14, wherein, when the cello is assembled, the vertical displacement of the top from its inherent flat shape at the location of the bridge is at least 2.5 mm.

16. The instrument of claim 1, wherein, when the instrument is assembled, the top has a vertical displacement from its inherent flat shape at the location of the bridge of at least 2.0 percent of the instrument's body length.

17. The instrument of claim 16, wherein, when the instrument is assembled, the vertical displacement of the top from its inherent flat shape at the location of the bridge is at least 2.7 percent of the instrument's body length.

18. The instrument of claim 17, wherein, when the instrument is assembled, the vertical displacement of the top from its inherent flat shape at the location of the bridge is at least 3.4 percent of the instrument's body length.

19. The instrument of claim 1, wherein, when the instrument is assembled, the top has a vertical displacement from its inherent flat shape at the location of the bridge of at least 6.5 percent of the instrument's center bout width.

20. The instrument of claim 19, wherein, when the instrument is assembled, the vertical displacement of the top from its inherent flat shape at the location of the bridge is at least 8.6 percent of the instrument's center bout width.

21. The instrument of claim 20, wherein, when the instrument is assembled, the vertical displacement of the top from its inherent flat shape at the location of the bridge is at least 10.8 percent of the instrument's center bout width.

* * * * *